United States Patent
Ogino

[11] Patent Number: 6,026,343
[45] Date of Patent: Feb. 15, 2000

[54] ANTI-SKID CONTROL SYSTEM FOR AUTOMOTIVE VEHICLES

[75] Inventor: Kenji Ogino, Ishibashi, Japan

[73] Assignee: Nissan Motor Co., Ltd., Yokohama, Japan

[21] Appl. No.: 08/790,740

[22] Filed: Jan. 27, 1997

[30] Foreign Application Priority Data

Jan. 30, 1996 [JP] Japan .................................. 8-014631

[51] Int. Cl.[7] .................................. B60T 8/58; B60T 8/62
[52] U.S. Cl. .......................... 701/72; 701/70; 701/71; 701/73; 701/78; 701/75; 701/81; 303/146
[58] Field of Search .................................. 701/72, 78, 75, 701/81, 70, 71, 73; 303/146

[56] References Cited

U.S. PATENT DOCUMENTS

| | | | |
|---|---|---|---|
| 5,140,524 | 8/1992 | Matsuda | 364/426.01 |
| 5,488,557 | 1/1996 | Matsuda | 364/426.02 |
| 5,752,752 | 5/1998 | Tozu et al. | 701/72 |
| 5,799,261 | 8/1998 | Ozaki et al. | 701/72 |

FOREIGN PATENT DOCUMENTS 61-285163  12/1986  Japan .
4-339065   11/1992  Japan .
8-188138    7/1996  Japan .

*Primary Examiner*—William A. Cuchlinski, Jr.
*Assistant Examiner*—Olga Hernandez
*Attorney, Agent, or Firm*—Foley & Lardner

[57] ABSTRACT

An anti-skid control system for an automotive vehicle, comprises a plurality of actuators each associated with one of front-left, front-right, rear-left and rear-right road wheels, for adjusting braking forces applied to the road wheels, sensors for detecting wheel speeds of the road wheels to generate wheel-speed indicative signals, and a controller for controlling the actuators in response to the wheel-speed indicative signals. The controller controls a hydraulic actuator associated with a controlled outer rear road wheel through a so-called select-LOW process between a wheel-speed indicative signal value of the controlled rear outer road wheel and a wheel-speed indicative signal value of a diagonal front wheel located on the vehicle diagonally to the controlled outer rear wheel only when the controller determines that the vehicle is in a cornering state with a high lateral acceleration during a braking-force control for the controlled outer rear wheel.

5 Claims, 7 Drawing Sheets

ANTI-SKID CONTROL SYSTEM FOR AUTOMOTIVE VEHICLES

BACKGROUND OF THE INVENTION

1. Field of the Invention

The present invention relates to an automotive anti-skid control system which prevents skidding and thus provides maximum effective braking and assures steering effect on turns by optimally controlling each wheel-brake cylinder pressure, and particularly to a system which can optimally control a braking force applied to each of rear wheels during braking, depending upon various running conditions of the vehicle without providing any expensive acceleration sensors.

2. Description of the Prior Art

As is generally known, on conventional automotive anti-skid control systems which can prevent wheel-lock during braking, each wheel-brake cylinder pressure is optimally controlled by adjusting a slip ratio at the slipping less-traction wheel towards a predetermined reference slip ratio. The slip ratio at the slipping less-traction wheel which is subjected to anti-skid control, is generally derived from the ratio of the deviation between a vehicle speed and a wheel speed detected at the slipping less-traction wheel with respect to the vehicle speed. On the other hand, the predetermined reference slip ratio means a desired ideal slip ratio advantageous to provide a maximum traction (maximum possible friction between the road surface and the tire) and to assure both a steering effect on turns and a shorter braking distance during braking. For instance, when the derived slip ratio at the slipping less-traction wheel exceeds the reference slip ratio, the brake-fluid pressure to the associated wheel-brake cylinder is reduced so as to prevent skidding or wheel-lock. In contrast, when the slip ratio becomes less than the reference slip ratio owing to the above-mentioned reduction of the wheel-brake cylinder pressure, the wheel-cylinder pressure is built up again so as to adjust the slip ratio towards the reference slip ratio. The braking force at the slipping less-traction wheel, which is subjected to anti-skid brake control, can be adjusted by automatically controlling the braking operation as if automatic pumping brake action is executed in cycles.

In case that the anti-skid control is made with respect to left and right rear wheels (unsteered wheels) during braking when the vehicle is traveling on a so-called splits road in which friction coefficients of left and right road surfaces are remarkably different from each other, for example the right-hand side road surface is a low-$\mu$ road, whereas the left-hand side road surface is a high-$\mu$ road, there is a braking-force difference between rear-left and rear-right wheels owing to the split-$\mu$ road. During braking on the split-$\mu$ road, the wheel speed of the slipping less-traction rear wheel (of a high possibility of wheel-lock and of a greater slip ratio) tends to become slower, while the wheel speed of the almost non-slipping greater-traction rear wheel of a less slip ratio tends to become faster. In this case, the conventional anti-skid control system controls rear-left and rear-right wheels simultaneously and in common with each other at the same anti-skid control mode in which the respective wheel-brake cylinder pressures of the rear wheels are controlled on the basis of data indicative of a slip ratio detected or estimated at one of rear wheels, namely the slipping less-traction rear wheel, (i.e., the slower-rotating rear wheel). Such an anti-skid control common to the rear wheels is often called a "select-LOW method" or a "select-LOW process". The select-LOW method is effective to enhance a steering stability and a controllability by reducing undesired yawing moment, when the anti-skid control is executed simultaneously at the rear wheels in common with each other during braking on the split-$\mu$ road. However, in the event that the rear wheels are simultaneously controlled in common with each other by way of the select-LOW method during braking on turns, the faster-turning outer rear wheel is also controlled in accordance with the same anti-skid control mode as the slower-turning inner rear wheel, irrespective of the fact that the outer rear wheel has a less possibility of wheel-lock than the inner rear wheel owing to shift of wheel-load from the inner rear wheel to the outer rear wheel. In this case, the braking force to be produced at the outer rear wheel tends to be suppressed unintendedly and excessively, thereby reducing the total braking force of the vehicle (the four wheels) and thus increasing the braking distance. To avoid this, Japanese Patent Provisional Publication (Tokkai Heisei) No. 4-339065 (corresponding to Japanese Patent Application No. 3-139436, and to U.S. patent application Ser. No. 883,017, filed May 14, 1992 and assigned to the assignee of the present invention) has disclosed an anti-skid control depending on the magnitude of lateral acceleration. In the U.S. patent application Ser. No. 883,017, the system employs a lateral-acceleration sensor for detecting a lateral acceleration exerted on the vehicle. When the magnitude of the lateral acceleration detected is small, rear-left and rear-right wheels are simultaneously controlled in accordance with the common anti-skid control mode based on a comparatively greater slip ratio detected at the slipping less-traction rear wheel. In contrast, when the magnitude of the lateral acceleration detected is great, the rear-left wheel and the rear-right wheel are controlled independently of each other on the basis of the respective slip ratios. In other words, the prior art system disclosed in the U.S. patent application Ser. No. 883,017 teaches the provision of a lateral-acceleration dependent anti-skid control mode selection means. In general, such a lateral-acceleration sensor is expensive. In order to enhance reliability in the anti-skid control, the prior art system may also require a fail-safe system in consideration of failure in the lateral-acceleration sensor, thus increasing total production costs of anti-skid control systems. To avoid this problem (the use of an expensive acceleration sensor), Japanese Patent Provisional Publication (Tokkai Heisei) No. 8-188138 (corresponding to Japanese Patent Application No. 7-4468, and to U.S. patent application Ser. No. 583,884, filed Jan. 11, 1996 and assigned to the assignee of the present invention) has disclosed an automobile anti-skid control system which can optimally control a braking force applied to a turning outer rear wheel during braking when the vehicle is rounding a curve and effectively suppress undesired yawing moment exerted on the vehicle during traveling on a so-called split-$\mu$ road, without employing any lateral-acceleration sensors. The U.S. patent application Ser. No. 583,884 teaches an anti-skid control that an actuator associated with a controlled rear wheel, which is subjected to a braking-force control, is controlled on the basis of the lower value of a wheel-speed indicative signal value of the controlled rear wheel and a wheel-speed indicative signal value of the diagonal front wheel located on the vehicle diagonally to the controlled rear wheel, during the braking-force control for the controlled rear wheel, in order to eliminate lack of the braking force applied to the rear outer road wheel turning during braking on turns without providing a lateral-acceleration sensor. That is to say, the anti-skid control system disclosed in the U.S. patent application Ser. No. 583,884 can execute a so-called select-LOW process between one diagonal road wheel pair (front-left and rear-right road wheels), or between another diagonal road wheel pair (front-right and rear-left road wheels). The rear wheel-brake actuator control based on the select-LOW process between a diagonal road wheel pair is very advantageous during braking on turns, since the braking force applied to the faster-rotating outer rear road wheel (of the second lightest wheel load) can be maintained at a value essentially equivalent to the braking force applied to the slower-rotating inner front road wheel (of the second heaviest wheel load) and thus a braking distance can be effectively decreased. The rear wheel-brake actuator control based on the select-LOW process between a diagonal road wheel pair is advantageous during traveling on the split-$\mu$ road, since the braking force applied to the rear road wheel rotating on the highs road can be properly adjusted toward a comparatively small braking force as applied to the front road wheel rotating on the low-i road and thus the braking-force difference between the rear-left and rear-right wheels can be effectively suppressed. However, in case of the anti-skid control system disclosed in the U.S. patent application Ser. No. 583,884, there is a possibility of the braking-force difference between rear-left and rear-right road wheels owing to the previously-noted rear wheel-brake actuator control based on the select-LOW process between a diagonal road wheel pair, during braking in a straight-ahead high-speed driving state of the vehicle. Additionally, when the rear wheel side is extremely heavily loaded with heavy luggage in comparison with the front wheel side, there is a tendency of lack of a braking force applied to the controlled rear wheel during the braking-force control for the rear-wheel side, owing to the previously-noted rear wheel-brake actuator control based on the select-LOW process between a diagonal road wheel pair.

SUMMARY OF THE INVENTION

Accordingly, it is an object of the invention to provide an improved anti-skid control system for automotive vehicles which avoids the foregoing disadvantages of the prior art.

It is an object of the invention to provide an automobile anti-skid control system which can properly control a braking force to be applied to rear road wheels in response to various driving conditions of the vehicle, such as during braking on turns with a high lateral acceleration, when the brakes are applied during straight-ahead driving or during driving on a split-$\mu$ road, without providing any expensive lateral-acceleration sensors.

It is another object of the invention to provide an inexpensive automobile anti-skid control system which can ensure an optimal anti-skid control irrespective of during turning or during straight-ahead driving on a split-$\mu$ road or during high-speed straight-ahead driving on high-$\mu$ roads such as dry pavements or on low-$\mu$ roads such as snow, wet or icy roads.

In order to accomplish the aforementioned and other objects of the invention, an anti-skid control system for an automotive vehicle comprises a plurality of actuators each associated with one of four road wheels located respectively at front-left, front-right, rear-left and rear-right positions of the vehicle, for adjusting braking forces applied to the four road wheels, sensor means for detecting wheel speeds of the four road wheels to generate wheel-speed indicative signals, control means for controlling the actuators in response to the wheel-speed indicative signals, and decision means for determining on the basis of a magnitude relationship between the wheel-speed indicative signals whether the vehicle is in a cornering state with a high lateral acceleration, wherein the control means controls the actuators associated with front wheels of the four road wheels independently of each other based on respective values of the wheel-speed indicative signals of the front wheels, wherein the control means controls the actuator associated with a controlled outer rear wheel of the four road wheels, which controlled outer rear wheel is subjected to a braking-force control, by reference to both a value of the wheel-speed indicative signal of the controlled outer rear wheel and a value of the wheel-speed indicative signal of a diagonal front wheel located on the vehicle diagonally to the controlled outer rear wheel when the decision means determines that the vehicle is in the cornering state with a high lateral acceleration during the braking-force control for the controlled outer rear wheel, and controls the actuator associated with a controlled inner rear wheel of the four road wheels, which controlled inner rear wheel is subjected to a braking-force control, by reference to both a value of the wheel-speed indicative signal of the controlled inner rear wheel and a value of the wheel-speed indicative signal of an opposite rear wheel opposite to the controlled inner rear wheel when the decision means determines that the vehicle is in the cornering state with a high lateral acceleration during the braking-force control for the controlled inner rear wheel.

Preferably, the control means may control the actuator associated with the controlled outer rear wheel through a select-LOW process between the value of the wheel-speed indicative signal of the controlled outer rear wheel and the value of the wheel-speed indicative signal of the diagonal front wheel when the decision means determines that the vehicle is in the cornering state with a high lateral acceleration during the braking-force control for the controlled outer rear wheel, and may control the actuator associated with the controlled inner rear wheel through a select-LOW process between the value of the wheel-speed indicative signal of the controlled inner rear wheel and the value of the wheel-speed indicative signal of the opposite rear wheel when the decision means determines that the vehicle is in the cornering state with a high lateral acceleration during the braking-force control for the controlled inner rear wheel. More preferably, the control means may control the actuator associated with a controlled rear wheel of the four road wheels through a select-LOW process between a value of the wheel-speed indicative signal of the controlled rear wheel and a value of the wheel-speed indicative signal of an opposite rear wheel opposite to the controlled rear wheel when the decision means determines that the vehicle is out of the cornering state with a high lateral acceleration during a braking-force control for the controlled rear wheel. The above-mentioned decision means may determine that the vehicle is in a left-hand cornering state with a high lateral acceleration during the braking-force control for the controlled rear wheel under a particular condition in which a value of the wheel-speed indicative signal of a front-left road wheel is greater than a value of the wheel-speed indicative signal of a rear-left road wheel. Also, the decision means may determine that the vehicle is in a right-hand cornering state with a high lateral acceleration during the braking-force control for the controlled rear wheel under a particular condition in which a value of the wheel-speed indicative signal of a front-right road wheel is greater than a value of the wheel-speed indicative signal of a rear-right road wheel.

DESCRIPTION OF THE PREFERRED EMBODIMENTS

Figure 1:
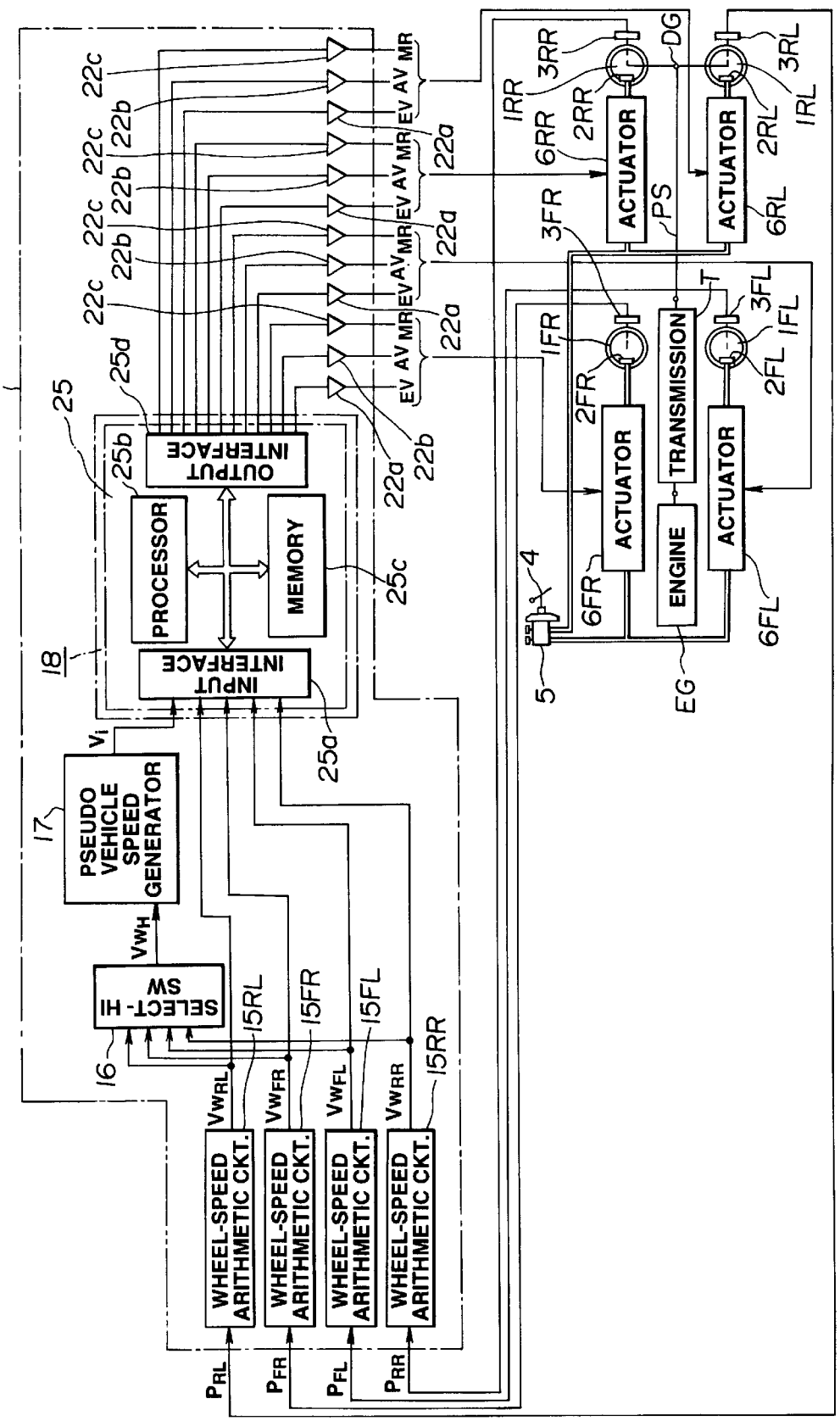
FIG. 1 is a block diagram illustrating one embodiment of an anti-skid control system according to the present invention.
Figure 2:
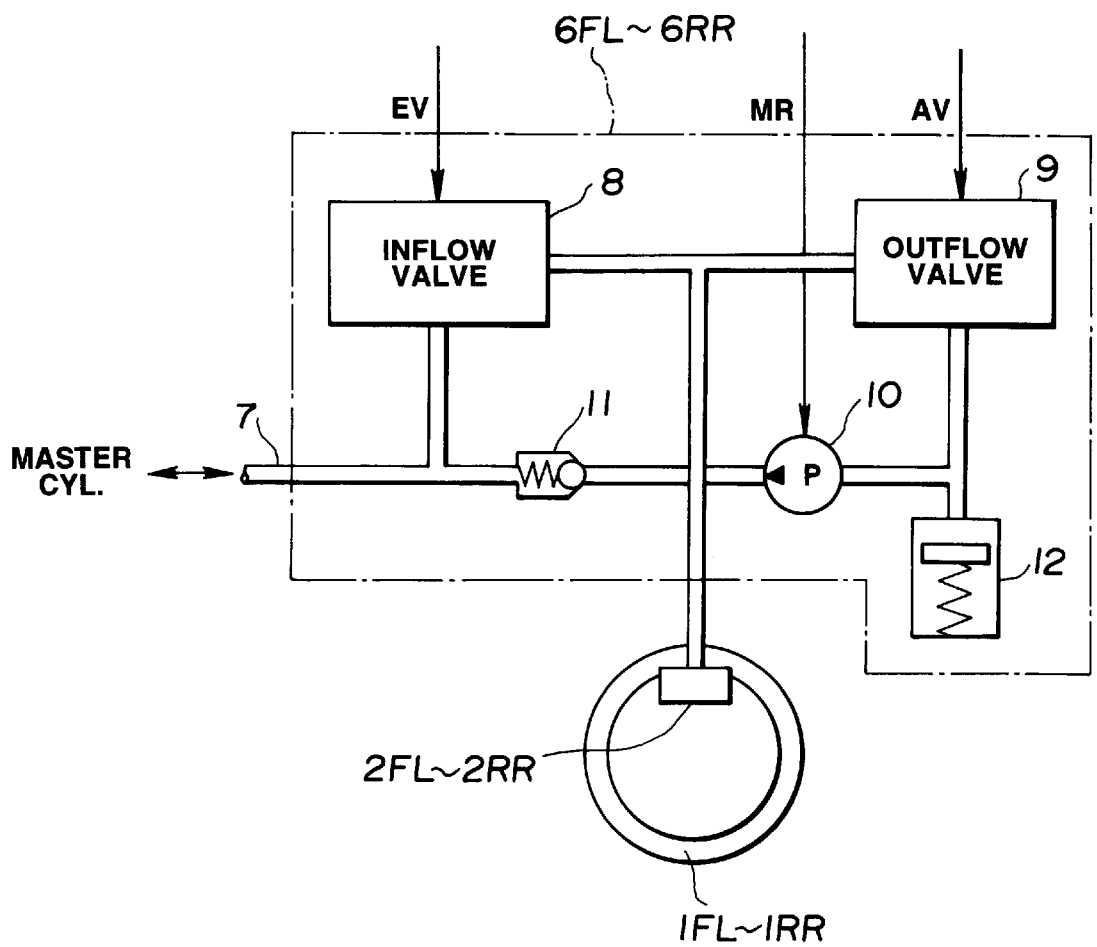
FIG. 2 is a hydraulic circuit diagram illustrating one embodiment of a hydraulic actuator incorporated in the anti-skid control system shown in FIG. 1.

Referring now to the drawings, particularly to FIGS. 1 and 2, the anti-skid control system of the invention is exemplified in case of a four-channel type anti-skid control system for a front-engine, rear-wheel drive vehicle. As seen in FIG. 1, engine power produced by an engine EG is transmitted through a transmission T and a propeller shaft PS, and distributed to rear-left and rear-right drive wheels 1RL and 1RR by means of a rear differential DG. Reference numerals 1FL and 1FR denote a front-left driven wheel and a front-right driven wheel, respectively. Wheel-brake cylinders 2FL, 2FR, 2RL and 2RR are provided at the road wheels 1FL, 1FR, 1RL and 1RR, respectively. Front-left, front-right, rear-left and rear-right wheel-speed sensors 3FL, 3FR, 3RL and 3RR are respectively provided at the front-left road wheel 1FL, the front-right road wheel 1FR, the rear-left road wheel 1RL and rear-right road wheel 1RR, so as to generate a pulse signal P$_{FL}$ indicative of the number of revolutions at the front-left road wheel 1FL, a pulse signal P$_{FR}$ indicative of the number of revolutions at the front-right road wheel 1FR, a pulse signal P$_{RL}$ indicative of the number of revolutions at the rear-left road wheel 1RL and a pulse signal P$_{RR}$ indicative of the number of revolutions at the rear-right road wheel 1RR. The front-left wheel-speed sensor 3FL, the front-right wheel-speed sensor 3FR, the rear-left wheel-speed sensor 3RL and the rear-right wheel-speed sensor 3RR are connected to a front-left wheel-speed arithmetic circuit 15FL, a front-right wheel-speed arithmetic circuit 15FR, a rear-left wheel-speed arithmetic circuit 15RL and a rear-right wheel-speed arithmetic circuit 15RR, respectively. Reference numeral 5 denotes a tandem master cylinder with two pistons, set in tandem. In the dual-brake system with the tandem master cylinder 5, a master cylinder pressure, which is developed by depression of a brake pedal 4 and generated from one port of the master cylinder, is fed to the front-wheel side, while a master-cylinder pressure, which is developed by depression of the brake pedal 4 and generated from the other port of the master cylinder, is fed to the rear-wheel side. In the front wheel brakes, the master-cylinder pressure from the one port is fed through a front-left wheel side hydraulic actuator 6FL to the front-left wheel-brake cylinder 2FL and is also fed through a front-right wheel side hydraulic actuator 6FR to the front-right wheel-brake cylinder 2FR. Thus, the wheel-cylinder pressures in the front-left and front-right wheel-brake cylinders 2FL and 2FR can be regulated independently of each other, by means of the two hydraulic actuators 6FL and 6FR. In the rear wheel brakes, the master-cylinder pressure from the other port is fed through a rear-left wheel side hydraulic actuator 6RL to the rear-left wheel-brake cylinder 2RL and also fed through a rear-right wheel side hydraulic actuator 6RR to the rear-right wheel-brake cylinder 2RR. Thus, the wheel-cylinder pressures in the rear-left and rear-right wheel-brake cylinders 2RL and 2RR can be regulated independently of each other, by means of the two hydraulic actuators 6RL and 6RR. As shown in FIG. 2, each of the actuators 6FL, 6FR, 6RL and 6RR includes an electromagnetic inflow valve 8 fluidly disposed between a hydraulic conduit 7 connected to the master cylinder 5 and the associated wheel-brake cylinder, an electromagnetic outflow valve 9 fluidly disposed in parallel with the inflow valve 8, an oil pump 10, a one-way check valve 11, and a pressure accumulator 12 fluidly disposed between the outlet port of the outflow valve 9 and the inlet port of the oil pump 10. The oil pump 10 serves as a return pump which returns the wheel-cylinder pressure towards the hydraulic conduit 7 in the pressure-reduction mode of the anti-skid control, while the pressure accumulator 12 is provided for temporarily accumulating a portion of the brake fluid pressure extracted from the wheel-brake cylinder during anti-skid control. The oil pump 10 and the check valve 11 are provided in series to each other and fluidly disposed between the inlet port of the inflow valve 8 and the outlet port of the outflow valve 9. In one exemplified hydraulic actuator shown in FIG. 2, although the oil pump 10 and the accumulator 12 are provided in one hydraulic actuator, the oil pump 10 and the accumulator 12 may be commonized in the respective actuators 6FL, 6FR, 6RL and 6RR. In case of commonization of both the oil pump 10 and the pressure accumulator 12, it will be appreciated that additional directional control valves are required for controlling inflow and outflow of brake fluid pressure to and from the pump 10 and the accumulator 12.

Returning to FIG. 1, a controller CR receives the four pulse signals P$_{FL}$, P$_{FR}$, P$_{RL}$ and P$_{RR}$ from the wheel-speed sensors 3FL, 3FR, 3RL and 3RR, and then generates three fluid-pressure control signals (logical-value indicative signals) EV, AV and MR to each of the four hydraulic actuators 6FL, 6FR, 6RL and 6RR. As best seen in FIG. 2, the fluid-pressure control signals EV, AV and MR are fed to each actuator, in such a manner as to control the inflow valve 8 by the signal EV, to control the outflow valve 9 by the signal AV, and to control the oil pump 10 by the signal MR. The controller CR includes four wheel-speed arithmetic circuits 15FL, 15FR, 15RL and 15RR, respectively receiving the revolution-speed indicative pulse signals P$_{FL}$, P$_{FR}$, P$_{RL}$ and P$_{RR}$ from the wheel-speed sensors 3FL, 3FR, 3RL and 3RR. The respective wheel-speed arithmetic circuits 15FL, 15FR, 15RL and 15RR derive a front-left wheel speed, a front-right wheel speed, a rear-left wheel speed and a rear-right wheel speed on the basis of the four pulse signals P$_{FL}$, P$_{FR}$, P$_{RL}$ and P$_{RR}$ and the outside radius of each road wheel which is rotating, so as to generate a front-left wheel speed indicative signal Vw$_{FL}$, a front-right wheel speed indicative signal Vw$_{FR}$, a rear-left wheel speed indicative signal Vw$_{RL}$ and a rear-right wheel speed indicative signal Vw$_{RR}$. The wheel-speed indicative signals Vw$_{FL}$, Vw$_{FR}$, Vw$_{RL}$ and Vw$_{RR}$ represent a peripheral speed at the front-left road wheel 1FL, a peripheral speed at the front-right road wheel 1FR, a peripheral speed at the rear-left road wheel 1RL and a peripheral speed at the rear-right road wheels 1RR, respectively. The derived wheel-speed indicative signals VwFL, VwFR, VwRL and VwRR are supplied to an input interface (or an input interface circuit) 25a of a wheel-brake cylinder pressure control circuit 18 as hereinbelow described in detail. The controller CR includes a select-HIGH switch 16 for selecting the highest one of the wheel-speed indicative signals Vwj (j=FL, FR, RL, RR) as a select-HIGH wheel speed indicative signal VwH. The controller CR includes a pseudo vehicle speed generator (or an estimated vehicle speed generator) 17 which receives the select-HIGH wheel speed indicative signal VwH and estimates or calculates a pseudo vehicle speed on the basis of the signal VwH to produce a pseudo vehicle speed indicative signal Vi. The controller CR also includes the wheel-brake cylinder pressure control circuit 18, which receives the pseudo vehicle speed indicative signal Vi from the pseudo vehicle speed generator 17 and the wheel-speed indicative signals VwFL, VwFR, VwRL and VwRR from the wheel-speed arithmetic circuits 15FL, 15FR, 15RL and 15RR, for the purpose of the anti-skid control executed during braking. The output interface (or an output interface circuit) 25d of the wheel-brake cylinder pressure control circuit 18 outputs a plurality of control signals through four sets of drive circuits to the respective actuators 6FL, 6FR, 6RL and 6RR, so as to properly control the wheel-cylinder pressures at the respective wheel-brake cylinders 2FL, 2FR, 2RL and 2RR. As seen in FIG. 1, each drive-circuit set is constructed by three different drive circuits, namely a first drive circuit 22a provided for generating the fluid-pressure control signal EV to the inflow valve 8, a second drive circuit 22b provided for generating the fluid-pressure control signal AV to the outflow valve 9, and a third drive circuit 22c provided for generating the fluid-pressure control signal MR to the oil pump 10. Since the fluid-pressure control signal MR is set at a binary "1" only when the anti-skid control system comes into operation, the control signal MR can be referred to as an "anti-skid control system operating-state indicative signal" which will be hereinafter abbreviated to an "ABS operating-state indicative signal".

Japanese Patent Provisional Publication No. 2-306863 (corresponding to U.S. Pat. No. 5,140,524, issued Aug. 18, 1992 and assigned to the assignee of the present invention) and Japanese Patent Provisional Publication No. 61-285163 both disclose an automobile anti-skid control system employing a pseudo vehicle speed generator. A pseudo vehicle speed generator disclosed in the U.S. Pat. No. 5,140,524 utilizes both the select-HIGH wheel speed indicative signal VwH and the longitudinal acceleration indicative signal XG to estimate the pseudo vehicle speed. The pseudo vehicle speed generator includes a sample-and-hold circuit for sampling and holding a select-HIGH wheel speed indicative signal VwH selected by the select-HIGH switch 16 as an input signal when the ignition switch is turned ON, and for temporarily estimating it as the pseudo vehicle speed Vi. Ordinarily, a predetermined dead band is provided for optimally updating the pseudo vehicle speed Vi. When a newly sampled select-HIGH wheel speed indicative signal VwH exceeds the upper limit of the predetermined dead band or when the newly sampled select-HIGH wheel speed indicative signal VwH becomes less than the lower limit of the predetermined dead band, the newly sampled select-HIGH wheel speed indicative signal VwH is held as a new input signal. For example, when the newly sampled select-HIGH wheel speed indicative signal VwH exceeds the upper limit of the predetermined dead band, the pseudo vehicle speed Vi is estimated by adding an integrated value of a voltage equivalent to a preset wheel acceleration to the sampled select-HIGH wheel speed indicative signal VwH. When the newly sampled select-HIGH wheel speed indicative signal VwH is less than the lower limit of the predetermined dead band, the pseudo vehicle speed Vi is estimated by subtracting an integrated value of the sum of the absolute value of the longitudinal acceleration signal value XG from the sensor 13 and a predetermined offset value from the sampled select-HIGH wheel speed indicative signal VwH. On the other hand, Japanese Patent Provisional Publication No. 61-285163 teaches another arithmetic processing for a pseudo vehicle speed used for an anti-skid control. The system which has been disclosed in Japanese Patent Provisional Publication No. 61-285163 is different from the system disclosed in the U.S. Pat. No. 5,140,524 in that the pseudo vehicle speed generator employed in the system of the Japanese Patent Provisional Publication No. 61-285163 estimates a longitudinal acceleration exerted on the vehicle by differentiating the select-HIGH wheel speed indicative signal value VwH without using any expensive longitudinal acceleration sensor. Actually, the system disclosed in the Japanese Patent Provisional Publication No. 61-285163, includes a sample-and-hold circuit for sampling and holding a select-HIGH wheel speed indicative signal VwH as an input signal upon initiation of the braking action, and a differentiator for differentiating the select-HIGH wheel speed indicative signal value to estimate a longitudinal acceleration exerted on the vehicle. In more detail, the sample-and-hold circuit samples and holds the select-HIGH wheel speed indicative signal VwH as an initial value Vb(0) when an acceleration/deceleration value obtained by differentiating the select-HIGH wheel speed indicative signal value VwH becomes below a predetermined acceleration/deceleration value after initiation of braking action. A first estimation of the vehicle speed is calculated by subtracting a decrement (A0×T0) of the vehicle speed, which decrement is represented as the product of a predetermined gradient A0 (or a predetermined slope) and an elapsed time T0 counted from the time when the predetermined acceleration/deceleration value has been reached to the time when the predetermined acceleration/deceleration value is reached again, from the initial value Vb(0). The first estimation is selected as a selection wheel speed ViH for a predetermined time period ΔT. After the predetermined period ΔT has been elapsed, the select-HIGH wheel speed indicative signal value VwH is selected as a selection wheel speed ViH. Another select-HIGH switch is provided for selecting the highest one of the selection wheel speed ViH and the select-HIGH wheel speed indicative signal value VwH as a final pseudo vehicle speed Vi. Thereafter, each time the acceleration/deceleration value of the select-HIGH wheel speed indicative signal value VwH becomes below the predetermined acceleration/deceleration value, the current select-HIGH wheel speed indicative signal value VwH is sampled and held as a sampled wheel speed Vb(1). A gradient A1 is calculated by dividing the difference ΔVb(1) between the sampled wheel speed Vb(1) and the initially-sampled wheel speed Vb(0) by an elapsed time ΔTb(1) counted from the initial sampling time. A second estimation of the vehicle speed is calculated by subtracting the product (A1×Tc) of the gradient A1 and the elapsed time Tc, which time is obtained by subtraction of the sampling time Tb(1) from the current time, from the sampled wheel speed Vb(1). The second estimation is selected as a selection wheel speed ViH for the predetermined time period ΔT. After the predetermined period ΔT has been elapsed, the select-HIGH wheel speed indicative signal value VwH is selected as a selection wheel speed ViH. The highest one of the selection wheel speed $V_{iH}$ and the select-HIGH wheel speed indicative signal value $V_{WH}$ is selected as a final pseudo vehicle speed Vi. The previously-noted arithmetic operation is repeatedly executed. As may be appreciated, in the case of the Japanese Patent Provisional Publication No. 61-285163, since the pseudo vehicle speed Vi can be derived on the basis of the select-HIGH wheel speed indicative signal $V_{WH}$, there is no necessity of installing a longitudinal acceleration sensor on the vehicle. In the shown embodiment, the pseudo vehicle speed generator as disclosed in the Japanese Patent Provisional Publication No. 61-285163 is used. Alternatively, the pseudo vehicle speed Vi may be derived on the basis of both the sampled select-HIGH wheel speed indicative signal $V_{WH}$ and the longitudinal acceleration indicative signal $X_G$ from the longitudinal acceleration sensor installed on the vehicle body as disclosed in the U.S. Pat. No. 5,140,524. The teachings of the U.S. Pat. No. 5,140,524 are hereby incorporated by reference. Also, the sampled select-HIGH wheel speed indicative signal $V_{WH}$ itself may be set as the pseudo vehicle speed Vi.

Figure 3:
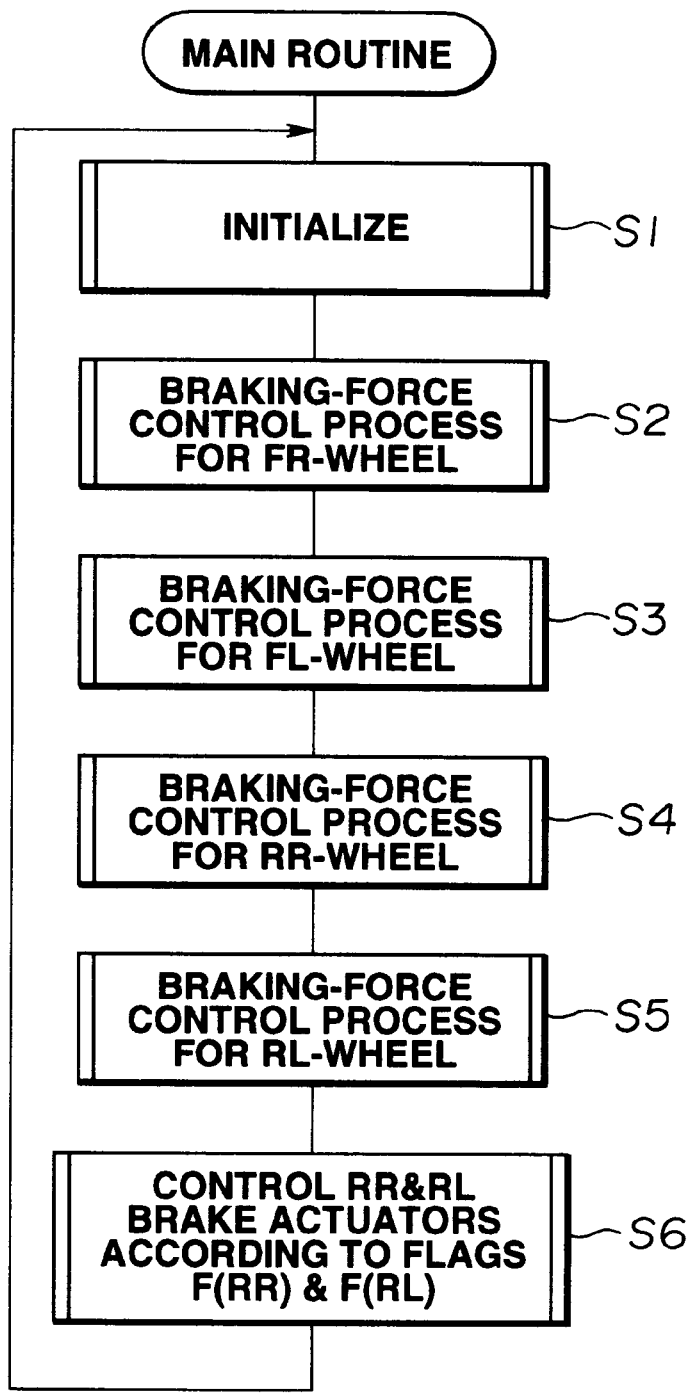
FIG. 3 is a flow chart illustrating a main routine of an anti-skid brake control executed by a wheel-brake cylinder pressure control circuit included in the anti-skid control system shown in FIG. 1.

On the basis of each of the wheel-speed indicative signal values $V_{WFL}$, $V_{WFR}$, $V_{WRL}$ and $V_{WRR}$ and the pseudo vehicle speed indicative signal value Vi estimated by the pseudo vehicle speed generator 17, the wheel-brake cylinder pressure control circuit 18 controls all the actuators 6FL, 6FR, 6RL and 6RR which adjust the brake-fluid pressures in the respective wheel-brake cylinders 2FL, 2FR, 2RL and 2RR. As seen in FIG. 1, the wheel-brake cylinder pressure control circuit 18 comprises a microcomputer 25 including at least the input interface 25a having an analogue-to-digital conversion function, the output interface 25d having a digital-to-analogue conversion function, an arithmetic processor 25b, and a memory 25c. The processor 25b of the wheel-brake cylinder pressure control circuit 18 derives the slip ratio of each road wheel on the basis of the wheel-speed indicative signal values Vwj (j=FL, FR, RL, RR) and the pseudo vehicle speed indicative signal value Vi. The processor 25b also functions to derive a positive and negative acceleration/deceleration indicative signal V'wj (j=FL, FR, RL, RR) at each road wheel, which signal V'wj is obtained by differentiating the wheel-speed indicative signal value Vwj at each road wheel or by dividing the deviation {Vwj(n)–Vwj(n-1)} between the current value (Vwj(n)) of the wheel-speed indicative signal value Vwj and the previous value (VWj(n-1)) of the wheel-speed indicative signal value Vwj by an elapsed time (a predetermined sampling time interval). The positive and negative acceleration/deceleration indicative signal V'wj will be hereinafter referred to as a "wheel acceleration/deceleration indicative signal". The processor 25b compares a calculated value λ of the slip ratio at each road wheel with a first reference slip ratio λ1 which is preselected in consideration of both a wheel-cylinder pressure build-up timing and a wheel-cylinder pressure-reduction timing and corresponds to an ideal slip ratio or a target slip ratio. Additionally, the processor 25b compares the calculated value λj (j=FL, FR, RL, RR) of the slip ratio at each road wheel with a second reference slip ratio λ2 pre-set at a greater slip ratio than the first reference slip ratio λ1. As explained later, the processor 25b compares the derived wheel acceleration/deceleration indicative signal V'wj (j=FL, FR, RL, RR) with a predetermined negative threshold b1 for a deceleration of the road wheel which deceleration corresponds to an angular deceleration of the road wheel, or with a predetermined positive threshold a for an acceleration of the road wheel which acceleration corresponds to an angular acceleration of the road wheel. In other words, the negative threshold b1 corresponds substantially to a threshold necessary for the pressure-reduction start timing, while the positive threshold a corresponds substantially to a threshold necessary for the pressure build-up start timing. In more detail, the negative threshold b1 is used as a threshold necessary for shifting from a rapid pressure build-up mode or a moderate pressure build-up mode to a high-pressure hold mode, while the positive threshold a is used as a threshold necessary for shifting from a rapid pressure-reduction mode to a low-pressure hold mode. On the basis of the above-noted comparison results, the pressure control circuit 18 properly controls the wheel-cylinder pressure at the respective wheel-brake cylinder 2FL, 2FR, 2RL and 2RR, by selecting one of six pressure control modes, namely a rapid pressure build-up mode at which the wheel-cylinder pressure is rapidly increased, a high-pressure hold mode at which the wheel-cylinder pressure is held constant at a high-pressure level, a low-pressure hold mode at which the wheel-cylinder pressure is held constant at a low-pressure level, a moderate pressure reduction mode at which the wheel-cylinder pressure is moderately reduced, a rapid pressure reduction mode at which the wheel-cylinder pressure is rapidly reduced, and a moderate pressure build-up mode at which the wheel-cylinder pressure is moderately increased, and by adjusting the wheel-cylinder pressure in accordance with the selected mode. As appreciated from the above, the anti-skid control executed by the anti-skid control system of the present invention is directed essentially to an anti-skid brake control according to which the wheel-brake cylinder pressure can be properly controlled. The anti-skid control system of the embodiment performs a braking-force control process for each road wheel in accordance with the main routine shown in FIG. 3. As seen in FIG. 3, the system executes a braking-force control process for the actuator 6FR of the front-right road wheel 1FR, a braking-force control process for the actuator 6FL of the front-left road wheel 1FL, a braking-force control process for the actuator 6RR of the rear-right road wheel 1RR and a braking-force control process for the actuator 6RL of the rear-left road wheel 1RL, in turns. As detailed later in reference to steps S4 through S6 of FIG. 3, in the braking-force control processes for the rear-right wheel-brake actuator 6RR and the rear-left wheel-brake actuator 6RL, the system sets a braking-force control flag representative of a particular wheel-cylinder pressure control mode which is dependent upon driving conditions such as a straight-ahead driving state, a vehicle turning state or the like, and whereby a brake-fluid pressure in each of the rear wheel-brake actuators 6RR and 6RL is controlled according to the braking-force control flag.

In FIG. 3, after initialization (See step S1), the arithmetic processor 25b of the microcomputer 25 executes first a braking-force control process (See step S2) corresponding to the ABS control for the actuator 6FR of the front-right road wheel 1FR, second a braking-force control process (See step S3) for the actuator 6FL of the front-left road wheel 1FL, third a braking-force control process (See step S4) for the actuator 6RR of the rear-right road wheel 1RR, and fourth a braking-force control process (See step S5) for the actuator 6RL of the rear-left road wheel 1RL, in that order. Actually, the system sets a rear-right wheel-brake control flag F(RR) indicative of a rear-right wheel braking-force control mode based on a current driving condition in step S4, and sets a rear-left wheel-brake control flag F(RL) indicative of a rear-left wheel braking-force control mode based on the current driving condition in step S5. In step S6, the system performs rear-right and rear-left wheel-brake actuator controls in accordance with the flags F(RR) and F(RL) respectively set at steps S4 and S5. Thereafter, the procedure returns to step S1. The main routine of FIG. 3 is executed as time-triggered interrupt routines to be triggered at predetermined time intervals. In the control procedure (the main routine) shown in FIG. 3, the road wheel assigned to the braking-force control process, currently executed, will be hereinafter referred to as a "controlled road wheel". Details of the braking-force control process for the front-right wheel road wheel 1FR correspond to a sub-routine shown in FIG. 4. Since the sub-routine for the braking-force control for the front-right road wheel 1FR is similar to that for the front-left road wheel 1FL, the control procedure of the braking-force control process of the front wheel side will be discussed hereinafter in detail in accordance with the flow chart indicated in FIG. 4, only in case of the front-right road wheel 1FR.

In step S2$a$, the front-right wheel-speed indicative signal V$_{WFR}$ from the front-right wheel-speed arithmetic circuit 15FR is read.

In step S2$b$, the wheel acceleration/deceleration indicative signal value V'$_{WFR}$ of the front-right wheel 1FR is calculated.

In step S2$c$, the pseudo vehicle speed Vi is read.

In step S2$d$, the slip ratio 2FR of the front-right wheel 1FR is calculated as a function of the front-right wheel speed indicative signal value V$_{WFR}$ and the pseudo vehicle speed Vi, in accordance with the following expression (1).

$$\lambda FR = 1 - V_{WFR}/Vi \qquad \ldots (1)$$

Figure 7:
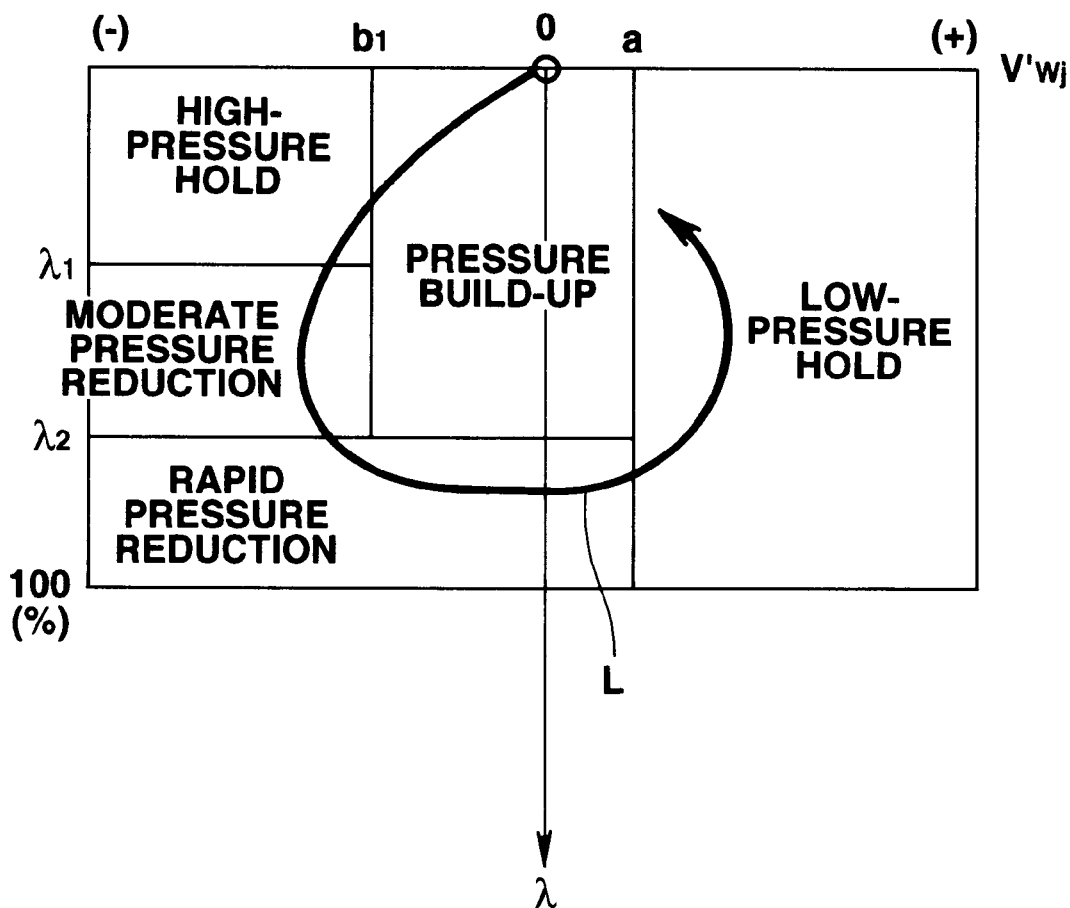
FIG. 7 is an explanatory view illustrating a predetermined control pattern (a predetermined control map) of the wheel-cylinder pressure control executed by the wheel-brake cylinder pressure control circuit shown in FIG. 1.

In step S2$e$, a decision is made to determine whether the anti-skid control can be terminated or continued. For example, the control circuit decides that the anti-skid control still continues under a particular condition in which the wheel acceleration/deceleration indicative signal value V'$_{WFR}$ is below the predetermined negative threshold b1 with a brake switch (not shown) switched ON, and the estimated pseudo vehicle speed Vi exceeds a predetermined low speed nearly equal to zero at the beginning of the anti-skid control, and additionally the frequency of the moderate pressure build-up mode is less than a predetermined value. The answer to step S2$e$ is affirmative (YES), i.e., in case that termination of the anti-skid control (the ABS control) is possible, i.e., when a necessary condition of continuation of the anti-skid control is unsatisfied, step S2$f$ proceeds in which the actuator 6FR of the controlled front-right road wheel 1FR, subjected to the ABS control, is set at the rapid pressure build-up mode in which the control signals EV and AV output to the actuator 6FR are both set at a logical value "0", and thus the inflow valve 8 is maintained in its full-open state and the outflow valve 9 is maintained in its fully-closed state. Conversely, when the answer to step S2$e$ is negative (NO), the procedure flows to step S2$g$. In step S2$g$, a front-right wheel braking-force control mode is determined on the basis of both the slip ratio λFR of the front-right wheel 1FR and the wheel acceleration/deceleration indicative signal value V'$_{WFR}$ by reference to the predetermined control pattern shown in FIG. 7. Actually, in step S2$g$ various tests are made to determined the front-right wheel braking-force control mode depending on various driving conditions of the vehicle. A first test is made to determine whether or not the wheel acceleration/deceleration indicative signal value V'$_{WFR}$ exceeds the predetermined positive threshold (corresponding to an acceleration threshold) a. In case of V'$_{WFR}$>a, the actuator 6FR of the controlled front-right road wheel 1FR is set at the low-pressure hold mode in which the control signal EV output to the actuator 6FR is set at the logical value "1" and the control signal AV output to the actuator 6FR is set at the logical value "0", and thus the inflow and outflow valves 8 and 9 of the actuator 6FR are both maintained in their fully-closed state to hold the internal pressure in the wheel-brake cylinder 2FR constant. On the other hand, in case of V'$_{WFR}$≦a, a second test is made to determine whether or not the slip ratio λFR of the front-right wheel 1FR is greater than the second reference slip ratio λ2. In case of λ>λ2, the controller decides that there is a tendency for the front-right wheel 1FR to lock, the actuator 6FR of the controlled front-right wheel 1FR is set at the rapid pressure-reduction mode in which the control signals EV and AV output to the actuator 6FR are both set at the logical value "1", and thus the inflow valve 8 of the actuator 6FR is maintained in the fully-closed state and the outflow valve 9 of the actuator 6FR is shifted to the fully-open state, with the result that the brake-fluid in the wheel-brake cylinder 2FR is quickly returned from the outflow valve 9 through the pump 10 and the check valve 11 to the master cylinder 5 and thus the internal pressure in the wheel-brake cylinder 2FR is reduced rapidly.

In case of λ≦λ2, a third test is made to determine whether or not the wheel acceleration/deceleration indicative signal value V'$_{WFR}$ exceeds the predetermined negative threshold (corresponding to a deceleration threshold) b1. In case of λ≦λ2 and V'$_{WFR}$>b1, the actuator 6FR of the controlled front-right road wheel 1FR is set at the moderate pressure build-up mode in which the control signal EV output to the actuator 6FR is alternately and periodically set at the logical values "1" and "0" and the control signal AV output to the actuator 6FR is set at the logical value "0", and thus the inflow valve 8 of the actuator 6FR is repeatedly opened and closed at predetermined time intervals and the outflow valve 9 of the actuator 6FR is maintained in the fully-closed state, with the result that the internal pressure in the wheel-brake cylinder 2FR is moderately built up in a stepwise manner. In contrast, in case of V'$_{WFR}$≦b1, a fourth test is made to determine whether or not the slip ratio λFR of the front-right wheel 1FR is greater than the first reference slip ratio λ1 (the target slip ratio). In case of V'$_{WFR}$≦b1 and λ>λ1, the actuator 6FR of the controlled front-right wheel 1FR is set at the moderate pressure-reduction mode in which the control signal EV output to the actuator 6FR is set at the logical value "1" and the control signal AV output to the actuator 6FR is alternately and periodically set at the logical values "1" and "0" and thus the inflow valve 8 of the actuator 6FR is maintained in the fully-closed state and the outflow valve 9 of the actuator 6FR is repeatedly opened and closed at predetermined time intervals, with the result that the internal pressure in the wheel-brake cylinder 2FR is moderately reduced in a stepwise manner. On the other hand, in case of V'$_{WFR}$≦b1 and λ≦λ1, the actuator 6FR of the controlled front-right wheel 1FR is set at the high-pressure hold mode in which, in the same manner as the low-pressure hold mode, the control signal EV output to the actuator 6FR is set at the logical value "1" and the control signal AV output to the actuator 6FR is set at the logical value "0", and thus the inflow and outflow valves 8 and 9 of the actuator 6FR are both maintained in their fully-closed state to hold the internal pressure in the wheel-brake cylinder 2FR constant. After step S2$g$, the sub-routine shown in FIG. 4 terminates and then the control procedure returns to the main routine (step S3) shown in FIG. 3.

Figure 5:
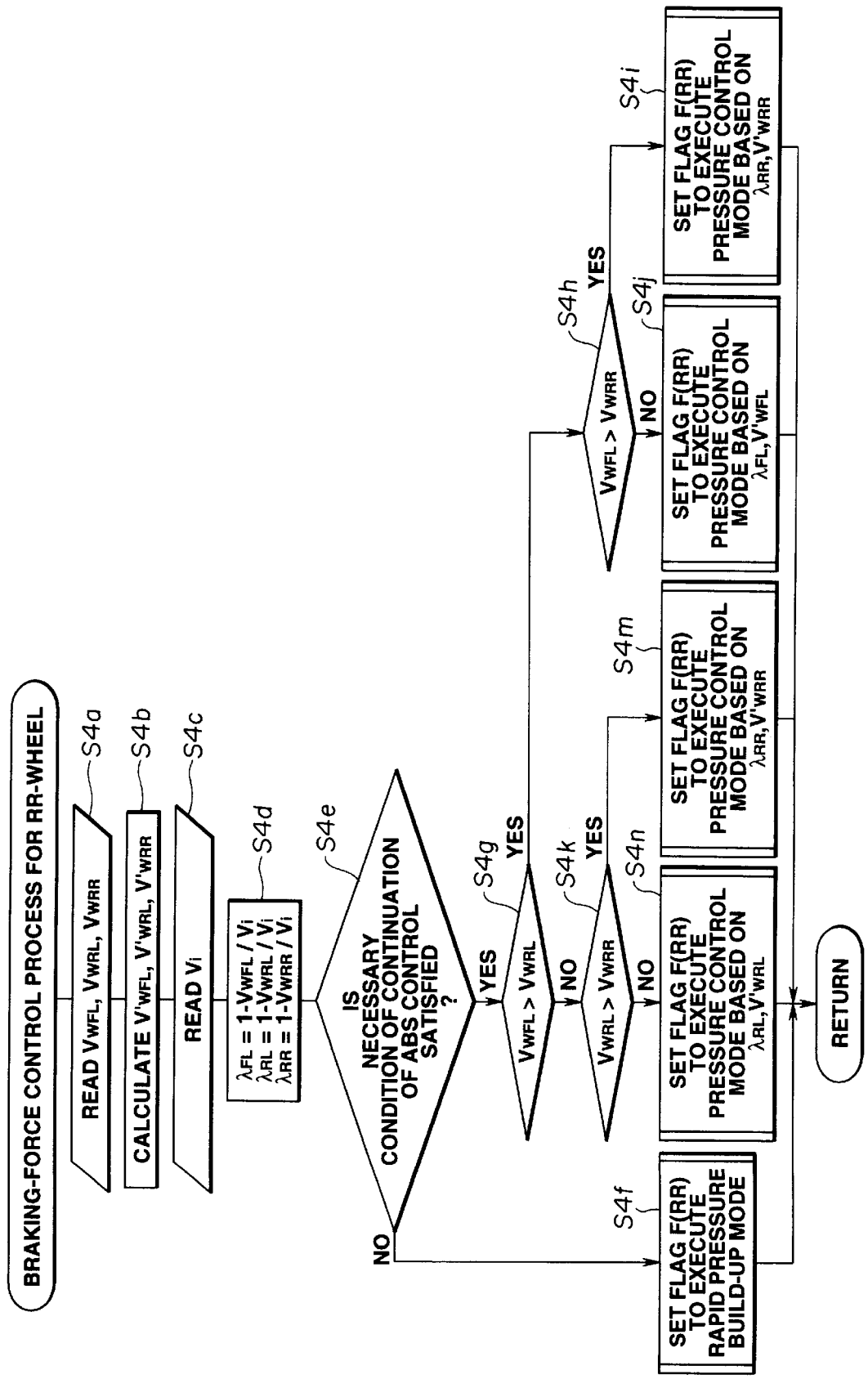
FIG. 5 is a flow chart illustrating a sub-routine of the braking-force control process executed with respect to the rear-right road wheel.

Referring now to FIG. 5, there is shown the braking-force control process (relating to step S4 of FIG. 3) for the rear-right road wheel 1RR. The rear-right wheel braking-force control procedure will be explained hereinafter in detail in accordance with the flow chart indicated in FIG. 5.

In step S4a, the front-left wheel-speed indicative signal value $V_{WFL}$, the rear-left wheel-speed indicative signal value $V_{WRL}$, and the rear-right wheel-speed indicative signal value $V_{WRR}$ are read.

In step S4b, the front-left wheel acceleration/deceleration indicative signal value V'WFL, the rear-left wheel acceleration/deceleration indicative signal value V'WRL, and the front-left wheel acceleration/deceleration indicative signal value V'WRR, are calculated on the basis of the three wheel-speed indicative data signals $V_{WFL}$, $V_{WRL}$ and $V_{WRR}$.

In step S4c, the pseudo vehicle speed Vi is derived from the pseudo vehicle speed generator 17.

In step S4d, the three slip ratios $\lambda j$ (j=FL, RL, RR) of the front-left, rear-left and rear-right wheels 1FL, 1RL and 1RR are calculated as a function of the wheel speed indicative signal value Vwj and the pseudo vehicle speed Vi, in accordance with the expression $\lambda j = 1 - Vwj/Vi$.

Figure 4:
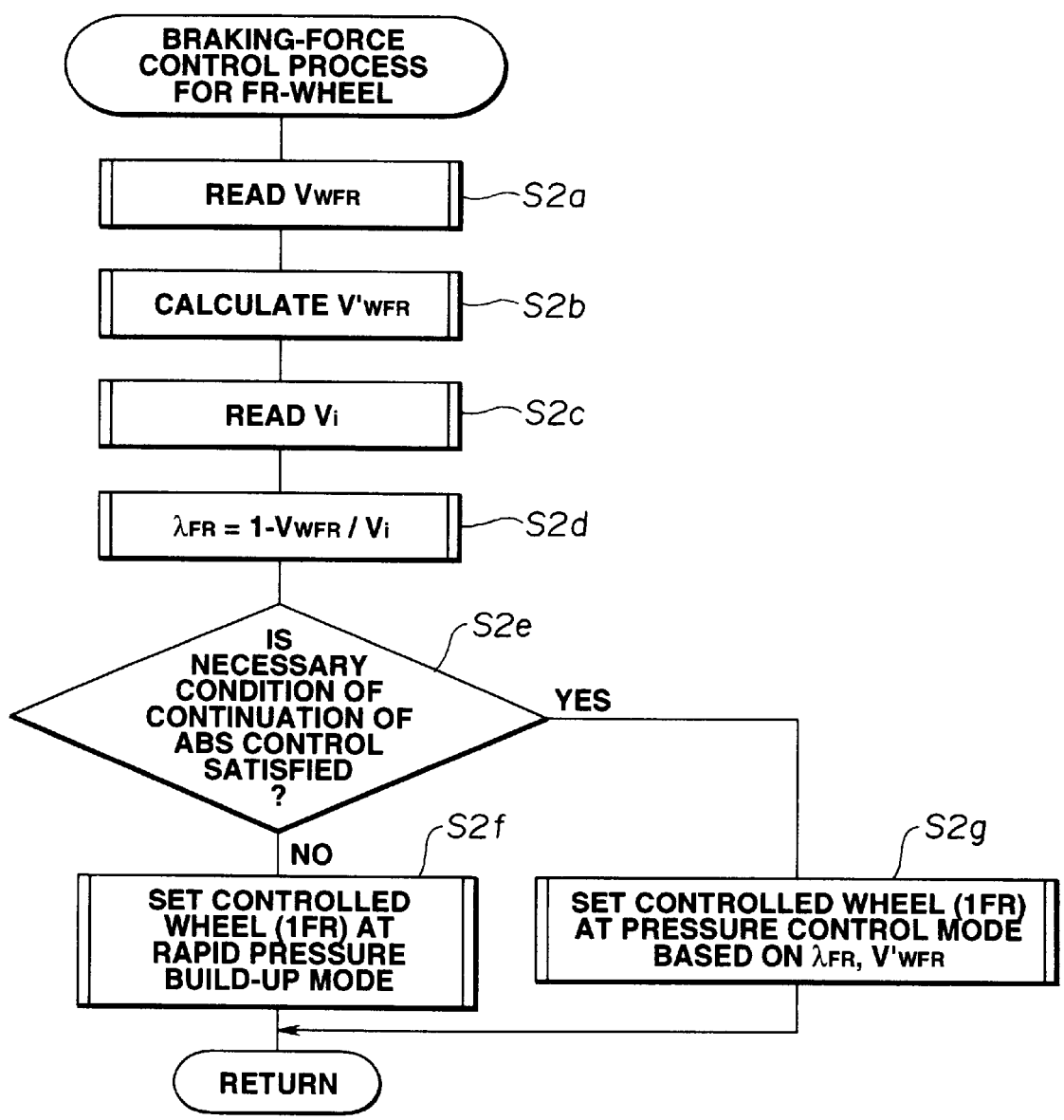
FIG. 4 is a flow chart illustrating a sub-routine of a wheel-cylinder pressure control process or a braking-force control process executed with respect to the front-right road wheel.

In step S4e, in the same manner as step S2e of FIG. 4, a decision is made to determine whether the necessary condition of continuation of the anti-skid control is satisfied. When the necessary condition of continuation of the anti-skid control is unsatisfied, step S4f proceeds to set a rear-right wheel-brake control flag F(RR) so that the rear-right and rear-left road wheels 1RR and 1RL are both set at the rapid pressure build-up mode in which the control signals EV and AV output to each of the actuators 6RR and 6RL are both set at a logical value "0", and thus the master-cylinder pressure is fed through the actuators 6RR and 6RL directly to the respective rear wheel-brake cylinders 2RR and 2RL. Thereafter, the procedure is returned to step S5 of the main routine of FIG. 3. Conversely, when the necessary condition of continuation of the anti-skid control is satisfied, step S4g proceeds in which a test is made to determine whether the front-left wheel speed indicative signal value $V_{WFL}$ is greater than the rear-left wheel speed indicative signal value $V_{WRL}$. In other words, the test of step S4g is provided to determine whether the vehicle is in a left-hand cornering state with a great or high lateral acceleration. During a left-hand turn with a great lateral acceleration, the slower-turning inner wheel side (particularly the rear-left road wheel) tends to rise to the road surface owing to a shift of wheel-load from the inner wheel side to the outer wheel side. Under a particular driving condition, namely during braking on a left-hand turn with a great lateral acceleration, there is a tendency that the vehicle experiences wheel-lock in order of the rear-left road wheel 1RL (of the lightest wheel load), the front-left road wheel 1FL, the front-right road wheel 1FR and the rear-right road wheel 1RR. Under such a particular condition (during a left-hand turn with a great lateral acceleration), the magnitude relationship between the respective wheel speeds of the four road wheels can be represented as the following inequality.

$$V_{WRR} > V_{WFR} > V_{WFL} > V_{WRL}$$

As is generally known, a braking-force distribution between front and rear road wheels is designed so that wheel-lock occurs at the front wheel side rather than the rear wheel side in consideration of a driving stability. Therefore, during a usual left-hand turn without a great lateral acceleration, there is a tendency that the front-left wheel speed $V_{WFL}$ becomes less than the rear-left wheel speed $V_{WRL}$ owing to the previously-noted braking-force distribution. In contrast with the usual left-hand turn, during the braking on a hard left-hand turn with a great lateral acceleration, the wheel speed $V_{WRL}$ of the rear-left road wheel tends to shift to the slowest value. Therefore, the system can determine whether the vehicle is in the left-hand turning state with a great lateral acceleration, by way of a decision box S4g (the inequality $V_{WFL} > V_{WRL}$). When the answer to step S4g is affirmative (YES), i.e., in case of $V_{WFL} > V_{WRL}$ (in the presence of a left-hand turn with a great lateral acceleration), step S4h enters in which a test is made to determine whether the front-left wheel speed indicative signal value $V_{WFL}$ is greater than the rear-right wheel speed indicative signal value $V_{WRR}$ of the controlled road wheel 1RR which is subjected to the anti-skid control. The decision diamond S4h is provided to select the lower one of the rear-right wheel speed indicative signal value $V_{WRR}$ of the controlled road wheel and the wheel speed indicative signal value $V_{WFL}$ of a diagonal front road wheel located on the vehicle diagonally to the controlled rear road wheel. Thus, in case of $V_{WFL} > V_{WRR}$, the system sets the rear-right wheel-brake control flag F(RR) according to the flow from step S4h to step S4i such that a braking-force control mode for the rear-right road wheel (the controlled road wheel 1RR) is properly selected from the moderate pressure build-up mode, the pressure-reduction mode and the pressure hold mode on the basis of the slip ratio $\lambda RR$ of the controlled rear-right road wheel and the rear-right wheel acceleration/deceleration indicative signal value V'WRR, while looking up the predetermined wheel-cylinder pressure control pattern shown in FIG. 7. In contrast, in case of $V_{WFL} \leq V_{WRR}$, the system sets the rear-right wheel-brake control flag F(RR) according to the flow from step S4h to step S4j such that a braking-force control mode for the rear-right road wheel (the controlled road wheel 1RR) is properly selected from the moderate pressure build-up mode, the pressure-reduction mode and the pressure hold mode on the basis of the slip ratio $\lambda FL$ of the diagonal front road wheel (the front-left road wheel) and the diagonal front wheel acceleration/deceleration indicative signal value V'WFL, while looking up the predetermined wheel-cylinder pressure control pattern shown in FIG. 7. These steps S4h, S4i and S4j correspond to the previously-described select-LOW process. Thereafter, the procedure flows from step S4i or S4j to step S5 of FIG. 3. Returning to step S4g, in case of $V_{WFL} \leq V_{WRL}$ (in the absence of a left-hand turn with a great lateral acceleration), step S4k enters in which a test is made to determine whether the rear-left wheel speed indicative signal value V'WRL is greater than the rear-right wheel speed indicative signal value $V_{WRR}$ of the controlled road wheel 1RR. The decision diamond S4k is provided to select the lower one of the rear-right wheel speed indicative signal value $V_{WRR}$ of the controlled road wheel and the wheel speed indicative signal value $V_{WRL}$ of an opposite rear road wheel located on the vehicle opposite to the controlled rear road wheel 1RR. Thus, in case of $V_{WRL} > V_{WRR}$, the procedure flows from step S4k to step S4m and then the system sets the rear-right wheel-brake control flag F(RR) so that a braking-force control mode for the rear-right road wheel (the controlled road wheel) is properly selected from the moderate pressure build-up mode, the pressure-reduction mode and the pressure hold mode on the basis of the slip ratio $\lambda RR$ of the controlled rear-right road wheel and the rear-right wheel acceleration/deceleration indicative signal value V'WRR, while looking up the predetermined wheel-cylinder pressure control pattern shown in FIG. 7. In contrast, in case of $V_{WRL} \leq V_{WRR}$, the procedure flows from step S4k to step S4n and then the system sets the rear-right wheel-brake control flag F(RR) so that a braking-force control mode for the rear-right road wheel (the controlled road wheel) is properly selected from the moderate pressure build-up mode, the pressure-reduction mode and the pressure hold mode on the basis of the slip ratio λRL of the opposite rear road wheel (the rear-left road wheel) and the opposite rear wheel acceleration/deceleration indicative signal value V'WRL, while looking up the predetermined wheel-cylinder pressure control pattern shown in FIG. 7. These steps S4k, S4m and S4n correspond to the previously-described select-LOW process. Thereafter, the procedure flows from step S4m or S4n to step S5 of FIG. 3.

Figure 6:
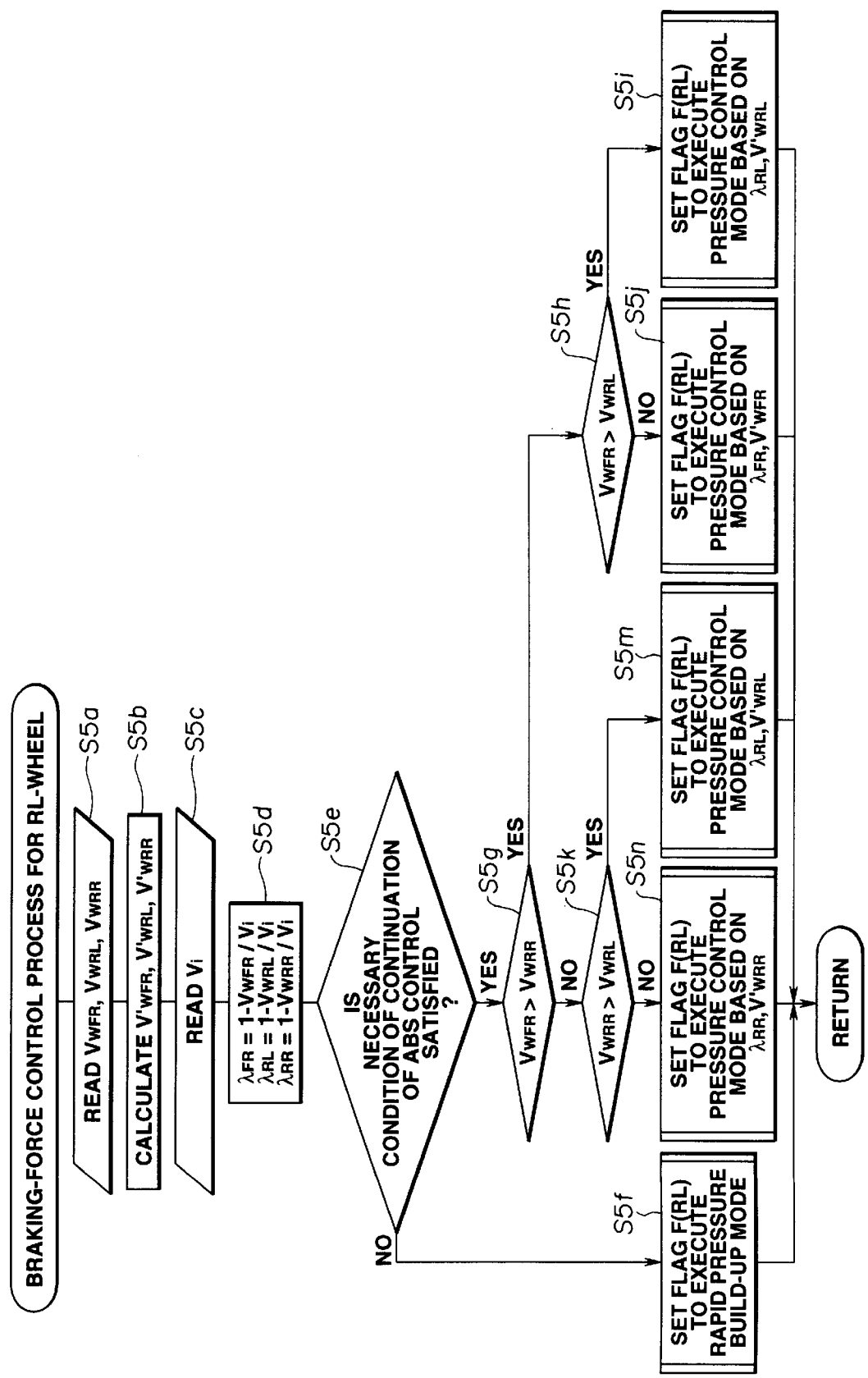
FIG. 6 is a flow chart illustrating a sub-routine of the braking-force control process executed with respect to the rear-left road wheel.

As may be appreciated from comparison of the flow chart shown in FIG. 6 with the flow chart shown in FIG. 5, the braking-force control process (relating to step S5 of FIG. 3) for the rear-left road wheel 1RL is similar to that for the rear-right road wheel. Hereinafter described in detail in accordance with the flow chart of FIG. 6 is the braking-force control procedure for the rear-left road wheel 1RL.

In step S5a, read are the front-right wheel-speed indicative signal value VWFR, the rear-left wheel-speed indicative signal value VWRL, and the rear-right wheel-speed indicative signal value VWRR.

In step S5b, the front-right wheel acceleration/deceleration indicative signal value V'WFR, the rear-left wheel acceleration/deceleration indicative signal value V'WRL, and the front-left wheel acceleration/deceleration indicative signal value V'WRR, are calculated on the basis of the three wheel-speed indicative data signals VWFR, VWRL and VWRR.

In step S5c, the pseudo vehicle speed Vi is derived from the pseudo vehicle speed generator 17.

In step S5d, the three slip ratios λj (j=FR, RL, RR) of the front-right, rear-left and rear-right wheels 1FL, 1RL and 1RR are calculated as a function of the wheel speed indicative signal value Vwj and the pseudo vehicle speed Vi, in accordance with the expression (1) (λj=1−Vwj/Vi).

In step S5e, a decision is made to determine whether the necessary condition of continuation of the anti-skid control is satisfied. When the necessary condition of continuation of the anti-skid control is unsatisfied, step S5f proceeds to set a rear-left wheel-brake control flag F(RL) so that the rear-right and rear-left road wheels 1RR and 1RL are both set at the rapid pressure build-up mode in which the control signals EV and AV output to each of the actuators 6RR and 6RL are both set at a logical value "0". Thereafter, the procedure is returned to step S6 of the main routine of FIG. 3. Conversely, when the necessary condition of continuation of the anti-skid control is satisfied, step S5g proceeds in which a test is made to determine whether the front-right wheel speed indicative signal value VWFR (the inner front wheel speed) is greater than the rear-right wheel speed indicative signal value VWRR (the inner rear wheel speed). In other words, the test of step S5g is provided to determine whether the vehicle is in a right-hand cornering state with a great lateral acceleration. During a right-hand turn with a great lateral acceleration, the slower-rotating inner wheel side (particularly the rear-right road wheel) tends to rise to the road surface owing to a shift of wheel-load from the inner wheel side to the outer wheel side. Under a particular driving condition, namely during braking on a right-hand turn with a great lateral acceleration, there is a tendency that the vehicle experiences wheel-lock in order of the rear-right road wheel 1RR (of the lightest wheel load), the front-right road wheel 1FR, the front-left road wheel 1FL and the rear-left road wheel 1RL. During braking on the right-hand turn with a great lateral acceleration, the magnitude relationship between the respective wheel speeds of the four road wheels can be represented as the following inequality.

VWRL>VWFL>VWFR>VWRR

In contrast with the usual right-hand turn without a great lateral acceleration, during the braking on a hard right-hand turn with a great lateral acceleration, the wheel speed VWRR of the rear-left road wheel tends to shift to the slowest value. Therefore, the system can determine whether the vehicle is in the right-hand turning state with a great lateral acceleration, by way of a decision box S5g (the inequality VWFR>VWRR). When the answer to step S5g is affirmative, i.e., in case of VWFR>VWRR (in the presence of a right-hand turn with a great lateral acceleration), step S5h enters in which a test is made to determine whether the front-right wheel speed indicative signal value VWFR is greater than the rear-left wheel speed indicative signal value VWRL of the controlled road wheel 1RL. The decision diamond S5h is provided to select the lower one of the rear-left wheel speed indicative signal value VWRL of the controlled road wheel and the wheel speed indicative signal value VWFR of a diagonal front road wheel located on the vehicle diagonally to the controlled rear road wheel. Thus, in case of VWFR>VWRL, the system sets the rear-left wheel-brake control flag F(RL) according to the flow from step S5h to step S5i such that a braking-force control mode for the rear-left road wheel (the controlled road wheel 1RL) is properly selected from the moderate pressure build-up mode, the pressure-reduction mode and the pressure hold mode on the basis of the slip ratio λRL of the controlled rear-left road wheel and the rear-left wheel acceleration/deceleration indicative signal value V'WRL, while looking up the predetermined wheel-cylinder pressure control pattern shown in FIG. 7. In contrast, in case of VWFR≦VWRL, the system sets the rear-left wheel-brake control flag F(RL) according to the flow from step S5h to step S5j such that a braking-force control mode for the rear-left road wheel (the controlled road wheel 1RL) is properly selected from the moderate pressure build-up mode, the pressure-reduction mode and the pressure hold mode on the basis of the slip ratio λFR of the diagonal front road wheel (the front-right road wheel) and the diagonal front wheel acceleration/deceleration indicative signal value V'WFR, while looking up the predetermined wheel-cylinder pressure control pattern shown in FIG. 7. These steps S5h, S5i and S5j correspond to the previously-described select-LOW process. Thereafter, the procedure flows from step S5i or S5j to step S6 of FIG. 3. Returning to step S5g, in case of VWFR≦VWRR (in the absence of a right-hand turn with a great lateral acceleration), step S5k enters in which a test is made to determine whether the rear-right wheel speed indicative signal value VWRR is greater than the rear-left wheel speed indicative signal value VWRL of the controlled road wheel 1RL. The decision diamond S5k is provided to select the lower one of the rear-left wheel speed indicative signal value VWRL of the controlled road wheel and the wheel speed indicative signal value VWRR of an opposite rear road wheel located on the vehicle opposite to the controlled rear road wheel 1RL. Thus, in case of VWRR>VWRL, the procedure flows from step S5k to step S5m and then the system sets the rear-left wheel-brake control flag F(RL) so that a braking-force control mode for the rear-left road wheel (the controlled road wheel) is properly selected from the moderate pressure build-up mode, the pressure-reduction mode and the pressure hold mode on the basis of the slip ratio λRL of the controlled rear-left road wheel and the rear-left wheel acceleration/deceleration indicative signal value V'WRL, while looking up the predetermined wheel-cylinder pressure control pattern shown in FIG. 7. In contrast, in case of VWRR≦VWRL, the procedure flows from step S5k to step S5n and then the system sets the rear-left wheel-brake control flag F(RL) so that a braking-force control mode for the rear-left road wheel (the controlled road wheel 1RL) is properly selected from the moderate pressure build-up mode, the pressure-reduction mode and the pressure hold mode on the basis of the slip ratio $\lambda$RR of the opposite rear road wheel (the rear-right road wheel) and the opposite rear wheel acceleration/deceleration indicative signal value V'WRR, while looking up the predetermined wheel-cylinder pressure control pattern shown in FIG. 7. These steps S5$k$, S5$m$ and S5$n$ correspond to the previously-described select-LOW process. Thereafter, the procedure flows from step S5$m$ or S5$n$ to step S6 of FIG. 3. As set out above, step S4$g$ of FIG. 5 serves to detect the presence or absence of the left-hand turn with a great lateral acceleration, whereas step S5$g$ of FIG. 6 serves to detect the presence or absence of the right-hand turn with a great lateral acceleration.

The system made according to the present invention operates as follows.

On the assumption that the vehicle is traveling at a constant speed on high-$\lambda$ roads, such as dry pavements, and thus the brakes are not applied, when the main routine shown in FIG. 3 begins, the control procedure flows from step S2$e$ to step S2$f$ in the sub-routine shown in FIG. 4 and also flows from step S4$e$ to step S4$f$ in the sub-routine shown in FIG. 5 and also flows from step S5$e$ to step S5$f$ in the sub-routine shown in FIG. 6, since the necessary condition for termination of the ABS control is satisfied, that is the necessary condition for continuation of the ABS control is unsatisfied. As a result, the respective actuators 6FR, 6FL, 6RR and 6RL of the front-right road wheel 1FR, the front-left road wheel 1FL, the rear-right road wheel 1RR and the rear-left road wheel 1RL are all set at the rapid pressure build-up mode. In this case, with the brakes released, the master-cylinder pressure is essentially zero, and thus the internal pressure in each wheel-brake cylinder is maintained at zero, with the result that non-braking condition is continued. Thereafter, when shifting from the constant-speed driving state on the high-$\mu$ road to the braking state, the brake-fluid pressure in each of the wheel-brake cylinders 2FR, 2FL, 2RR and 2RL rapidly increases owing to a pressure-rise in the master-cylinder pressure to produce a great braking force. When the brakes are applied during the straight-ahead driving on high-$\mu$ roads, each of the wheel-speed indicative signal values VWFL, VWFR, VWRL and VWRR is gradually decreased due to great traction between each road wheel and the road surface of a high friction coefficient. As seen in the characteristic curve L (or the predetermined control pattern) of the ABS control shown in FIG. 7, the respective acceleration/deceleration indicative signal values V'WFL, V'WFR, V'WRL and V'WRR vary in the negative direction indicated by (−) and corresponding to a direction of increase in deceleration. Since the necessary condition for initiation of the ABS control is satisfied when each acceleration/deceleration indicative signal value V'w$j$ (j=FL, FR, RL, RR) becomes less than or equal to the predetermined negative threshold b1, the anti-skid control (ABS control) initiates. Upon initiation of the ABS control, the procedure shifts from step S2$e$ to step S2$g$ in the sub-routine of FIG. 4 and also shifts from step S4$e$ to step S4$g$ in the sub-routine of FIG. 5, and also shifts from step S5$e$ to step S5$g$ in the sub-routine of FIG. 6. At this time, since the vehicle is in the straight-ahead driving state on high-$\mu$ roads, there is a tendency that wheel-lock occurs at the front-wheel side rather than the rear-wheel side during braking, owing to the conventional braking-force distribution as previously discussed. Therefore, when brakes are applied during the straight-ahead driving on high-i roads, the magnitude relationship between wheel speeds of the four road wheels is represented as follows.

$$V_{WFR},\ V_{WFL} > V_{WRR},\ V_{WRL}$$

With the braking-force control process for the front-right road wheel 1FR, the anti-skid control (the braking-force control) is executed such that the braking-force control mode is properly selected from the high-pressure hold mode, the moderate pressure-reduction mode, the rapid pressure-reduction mode, the low-pressure hold mode and the moderate pressure build-up mode in turns on the basis of the front-right wheel slip ratio $\lambda$FR and the front-right wheel acceleration/deceleration indicative signal value V'WFR. With the braking-force control process for the front-left road wheel 1FL, the anti-skid control is executed such that the braking-force control mode is properly selected on the basis of the front-left wheel slip ratio $\lambda$FL and the front-left wheel acceleration/deceleration indicative signal value V'WFL. In this manner, the slip ratios $\lambda$FR and $\lambda$FL of the front wheel side can be adjusted toward the target slip ratio $\lambda$1.

On the other hand, with the braking-force control process for the rear-right road wheel 1RR, assuming that the rear-right wheel speed indicative signal value VWRR is identical to the rear-left wheel speed indicative signal value VWRL during the straight-ahead driving on high-$\mu$) roads, the procedure flows from step S4$g$ to step S4$k$ in the sub-routine of FIG. 5, since the wheel speed of the drive wheel (1RL, 1RR) is ordinarily greater than that of the driven wheel (1FL, 1FR) and thus the magnitude relation represented by the inequality VWFL $\leq$ VWRL is satisfied. Additionally, due to the magnitude relation represented by the inequality VWRR= VWRL, the procedure further flows from step S4$k$ to step S4$n$. In step S4$n$, the pressure control mode for the rear-right wheel-brake actuator 6RR is determined on the basis of the slip ratio $\lambda$RL of the opposite rear road wheel (the rear-left wheel 1RL) and the rear-left wheel acceleration/deceleration indicative signal value V'WRL by reference to the predetermined control pattern (see FIG. 7). Similarly, with the braking-force control process for the rear-left road wheel 1RL, the procedure flows from step S5$g$ via step S5$k$ to step S5$n$ in the sub-routine of FIG. 6, owing to the magnitude relation represented by VWFR>VWRR and VWRR=VWRL. Thus, the pressure control mode for the rear-left wheel-brake actuator 6RL is determined on the basis of the slip ratio $\lambda$RR of the opposite rear road wheel (the rear-right wheel 1RR) and the rear-right wheel acceleration/deceleration indicative signal value V'WRR by reference to the predetermined control pattern (see FIG. 7). In the event that the rear-right and rear-left wheel speed indicative signal values VWRR and VWRL fluctuate due to road surface conditions during the straight-ahead driving on high-$\mu$ roads, the lower one of the rear-right and rear-left wheel speed indicative signal values VWRR and VWRL is selected through steps S4$k$ (see FIG. 5) and S5$k$ (see FIG. 6), and then the pressure control mode for the respective rear wheel-brake actuator (6RR, 6RL) is determined on the basis of the slip ratio $\lambda$j and the wheel acceleration/deceleration indicative signal value V'w$j$ of the rear road wheel selected by the select-LOW process, with the result that the slip ratios $\lambda$RR and $\lambda$RL of the rear wheel side can be adjusted toward the target slip ratio $\lambda$1.

As set forth above, during braking in the straight-ahead driving on high-$\mu$ roads, with the braking-force control process for the front-wheel side the anti-skid control for the front-left road wheel 1FL and the anti-skid control for the front-right road wheel 1FR are executed independently of each other, whereas with the braking-force control process for the rear-wheel side the anti-skid control for the rear-left road wheel 1RL and the anti-skid control for the rear-right road wheel 1RR are simultaneously executed in common with each other on the basis of the slip ratio λj and the wheel acceleration/deceleration indicative signal value V'wj of the rear road wheel selected by the select-LOW process. Therefore, the driving stability can be enhanced during straight-ahead driving. Additionally, even when there is remarkable shift of wheel-load between the front-wheel side and the rear-wheel side owing to heavy luggage, a proper anti-skid control can be made with respect to the controlled rear road wheel, since the pressure control mode (or the braking-force control mode) for the controlled rear road wheel is not affected by the wheel speed indicative signal value of the diagonal front road wheel located on the vehicle diagonally to the controlled rear road wheel.

In the event that the brakes are applied quickly during driving on low-$\mu$ roads, such as wet, icy or snow roads, the brake-fluid pressure in the respective wheel-brake cylinder 2$j$ increases rapidly owing to a steep pressure-rise in the master-cylinder pressure, thereby resulting in a rapid decrease in the wheel speed indicative signal values Vwj (j=FL, FR, RL, RR). This results in a rapid increase in the slip ratio λj of each road wheel. As soon as the slip ratio λj of the controlled road wheel exceeds the second reference slip ratio λ2, with the braking-force control process for the front-wheel side, the front wheel-brake actuators 6FL and 6FR are set at a rapid pressure-reduction mode based on the slip ratio λFL and the front-left wheel acceleration/deceleration indicative signal V'WFL and at a rapid pressure-reduction mode based on the slip ratio λFR and the front-left wheel acceleration/deceleration indicative signal V'WFR independently of each other. On the other hand, with the braking-force control process for the rear-wheel side, the rear wheel-brake actuators 6RL and 6RR are both set at a rapid pressure-reduction mode based on the slip ratio λj and the rear wheel acceleration/deceleration indicative signal value V'wj both (λj, V'wj) of which are derived from the lower rear wheel speed indicative signal value. As a result, in case of during hard braking on low-$\mu$ roads, the fluid pressure in each of the wheel-brake cylinders 2$j$ (j=FL, FR, RL, RR) can be quickly reduced as compared with during driving on high-$\mu$ roads. This effectively prevents the road wheels 1$j$ (j=FL, FR, RL, RR) from being locked even during braking on low-$\mu$ roads.

Suppose the vehicle is traveling on a so-called split-$\mu$ road, for example, the front-left road wheel 1FL and the rear-left road wheel 1RL are rotating on a low-$\mu$ road, whereas the front-right road wheel 1FR and the rear-right road wheel 1RR are rotating on a high-$\mu$ road. Under this condition, when the brakes are applied, there is a tendency for the wheel speed indicative signal values VWFL and VWRL of the left-hand side road wheels 1FL and 1RL rotating on the low-$\mu$ road to be remarkably reduced, as compared with those of right-hand side road wheels 1FR and 1RR rotating on the high-$\mu$ road. Owing to the conventional braking-force distribution between front and rear road wheels, there is a tendency that the vehicle experiences wheel-lock in order of the front-left road wheel 1FL, the rear-left road wheel RL, the front-right road wheel 1FR and the rear-right road wheel 1RR. During braking on a so-called split-$\mu$ road, the magnitude relationship between the respective wheel speeds of the four road wheels can be represented as the following inequality.

$$V_{WRR} > V_{WFR} > V_{WRL} > V_{WFL}$$

Thus, the front-left and front-right road wheels 1FL and 1FR are controlled independently of each other according to the sub-routine as shown in FIG. 4. On the other hand, when the braking-force control processes for the rear road wheels 1RL and 1RR are executed according to the sub-routines shown in FIGS. 5 and 6, respectively. As regards the rear-right road wheel 1 RR the system determines that the vehicle is not in the turning state with a great lateral acceleration through step S4$g$ because of VWFL>VWRL. Thus, the procedure flows from step S4$g$ to step S4$k$ and then to step S4$n$ because of VWRL>VWRR, with the result that the rear-right wheel-brake control flag F(RR) is set in such a manner that the rear-right wheel-brake actuator 6RR is controlled on the basis of the slip ratio λRL of the rear-left road wheel 1RL (of easy wheel-lock tendencies) on low-$\mu$ road and the rear-left wheel acceleration/deceleration indicative signal value V'WRL by reference to the predetermined control pattern (see FIG. 7). As regards the rear-left road wheel 1RL the system determines that the vehicle is not in the turning state with a great lateral acceleration through step S5$g$ because of VWFR≦VWRR. Thus, the procedure flows from step S5$g$ to step S5$k$ and then to step S4$m$ because of VWRR>VWRL, with the result that the rear-left wheel-brake control flag F(RL) is set in such a manner that the rear-left wheel-brake actuator 6RL is controlled on the basis of the slip ratio λRL of the rear-left road wheel 1RL (of easy wheel-lock tendencies) on low-$\mu$ road and the rear-left wheel acceleration/deceleration indicative signal value V'WRL by reference to the predetermined control pattern (see FIG. 7). As a consequence, the front-left and front-right wheel-brake actuators 6FL and 6FR are controlled independently of each other on the basis of the respective slip ratios (λFL, λFR) and wheel .acceleration/deceleration indicative signal values (V'WFL, V'WFR). The rear-left and rear-right wheel-brake actuators 6RL and 6RR are simultaneously controlled in common with each other on the basis of the slip ratio 1RL of the slower-rotating, less-traction rear-left road wheel 1RL (of easy wheel-lock tendencies) on low-$\mu$ road and the rear-left wheel acceleration/deceleration indicative signal value V'WRL by way of the select-LOW process. According to the select-LOW process, the braking force applied to the rear-right road wheel 1RR tends to be suppressed or reduced in comparison with the magnitude of the braking force computed or derived from both the slip ratio λRR and the wheel acceleration/deceleration indicative signal value V'WRR, these values λRR and V'WRR being based on the rear-right wheel speed indicative signal value VWRR. The reduced braking force applied to the rear-right road wheel 1RR (rotating on the highs road) is advantageous to produce an increased cornering force at the rear-right road wheel 1RR. Such an increased cornering force acts to suppress undesired development of yawing moment exerting on the vehicle, thus enhancing the driveability of the vehicle. In contrast with the above, suppose the brakes are applied when the vehicle is traveling on the split-$\mu$ road such that the right-hand road wheels 1FR and RR are rotating on a low-$\mu$ road, whereas the left-hand road wheels 1FL and 1RL are rotating on a high-$\mu$ road. In this case, similarly to the previously-discussed braking-force control performed during braking on the split-$\mu$ road with the left-hand road wheels on the low-$\mu$ road and the right-hand road wheels on the high-$\mu$ road, the front-left and front-right wheel-brake actuators 6FL and 6FR are controlled independently of each other on the basis of the respective slip ratios (λFL, λFR) and wheel acceleration/deceleration indicative signal values (V'WFL, V'WFR), while the rear-left and rear-right wheel-brake actuators 6RL and 6RR are simultaneously controlled in common with each other on the basis of the slip ratio 1RR of the slower-rotating, less-traction rear-right road wheel 1RR (of easy wheel-lock tendencies) on low-$\mu$ road and the rear-right wheel acceleration/deceleration indicative signal value V'WRR by way of the select-LOW process.

In the event that the brakes are applied while turning to the left on the high-$\mu$ road, the wheel-load of the left-hand road wheels 1FL and 1RL is shifted towards the right-hand road wheels 1FR and 1RR. During a left turn, the greater the lateral acceleration exerted on the vehicle, the greater the wheel-load of the right-hand side road wheels and the smaller the wheel-load of the left-hand side road wheels. From the viewpoint of the braking-force distribution, as previously discussed, the magnitude relationship between the respective wheel speeds of the four road wheels can be represented as an inequality of VWRR>VWFR>VWFL>VWRL. During a left-hand turn with a great lateral acceleration, the anti-skid controls for the front-left and front-right road wheels 1RL and 1RR are executed independently of each other. With the braking-force control process (see FIG. 5) for the rear-right road wheel 1RR (the higher-rotating, great-traction outer wheel), the controller CR determines that the vehicle is in the left-hand cornering state with a great lateral acceleration through step S4$g$, because of VWFL>VWRL, and thus the procedure flows from step S4$g$ to step S4$h$ (the select-LOW process for the rear-right wheel speed VWRR and the diagonal wheel speed VWFL). At step S4$h$, since the rear-right wheel speed indicative signal value VWRR is greater than the diagonal wheel speed indicative signal value VWFL of the front road wheel 1FL located diagonally to the rear-right road wheel 1RR, step S4$j$ enters so as to control the rear-right wheel-brake actuator 6RR according to the pressure control mode based on the slip ratio $\lambda$FL of the front-left wheel 1FL and the acceleration/deceleration indicative signal value V'WFL. On the other hand, with the braking-force control process (see FIG. 6) for the rear-left road wheel 1RL (the slower-rotating, less-traction inner wheel), the controller CR determines that the vehicle is not in the right-hand cornering state with a great lateral acceleration, because of the relation of VWFR<VWRR, and thus the procedure flows from step S5$g$ to step S5$k$ and then to step S5$m$, because of the relation of VWRR<VWRL. At step S5$m$, the controlled rear-left wheel-brake actuator 6RL is controlled according to the pressure control mode based on the slip ratio $\lambda$RL of the controlled road wheel 1RL and the acceleration/deceleration indicative signal value V'WRL of the rear-left wheel 1RL.

In the case of the left-hand turn with a great lateral acceleration, as regards the inner-wheel side, the magnitude relation indicated by the inequality of VWFL>VWRL may be continued for a while, due to the wheel-load shift to the outer-wheel side. As regards the diagonal road wheel pair (namely the front-left road wheel 1FL and the rear-right road wheel 1RR), the magnitude relation indicated by the inequality of VWFL>VWRR may not be always maintained, since the anti-skid control for the front-left road wheel 1FL (the diagonal road wheel) and the anti-skid control for the rear-right road wheel 1RR (the outer wheel turning) are executed independently of each other. In the event that the braking-force applied to the rear-right road wheel 1RR rises according to the pressure build-up mode and then the rear-right road wheel 1RR begins to lock, there is a possibility of the magnitude relation as defined by the inequality of VWFL$\leq$VWRR. In this case, the procedure shifts from step S4$h$ to step S4$i$, with the result that the hydraulic actuator 6RR associated with the controlled road wheel 1RR is controlled according to the pressure control mode based on the slip ratio $\lambda$RR of the controlled road wheel 1RR and the acceleration/deceleration indicative signal value V'WRR of the rear-right wheel 1RR. As a consequence, during a left-hand turn with a great lateral acceleration, in case of the anti-skid control for the rear-right road wheel 1RR (corresponding to the outer road wheel turning), the select-LOW process is performed between the controlled rear-right road wheel and its diagonal, front inner road wheel, whereby the system can apply a braking force (essentially identical to a braking force applied to the front-left road wheel 1FL and greater than a braking force applied to the rear-left road wheel 1RL) to the controlled rear-right road wheel 1RR, while preventing wheel-lock which may occur at the outer road wheels turning. This avoids undesired lack of the braking force applied to the outer rear road wheel turning during braking on turns, and the entire braking force of the vehicle is increased, thereby effectively reducing the braking distance. As regards the braking-force control process (see FIG. 6) for the rear-left road wheel 1RL, in the event that the rear-right road wheel 1RR begins to lock and the inequality of VWRR>VWRL is satisfied, there is a possibility that the procedure flows from step S5$k$ to step S5$m$. In this manner, as regards the anti-skid control for the inner rear wheel (the rear-left road wheel 1RL) turning, the select-LOW process is executed between the rear-left and rear-right road wheels 1RR and 1RL, thereby enhancing a cornering stability of the vehicle on turns. In case of a right-hand turn with a great lateral acceleration, owing to the magnitude relationship as indicated by VWRL>VWFL>VWFR>VWRR, firstly the procedure flows from step S5$g$ to step S5$h$ in the braking-force control process (see FIG. 6) for the rear-left road wheel 1RL. Thereafter, the select-LOW process, (see step S5$h$) is executed between the diagonal road wheel pair (namely the controlled rear-left road wheel 1RL and its diagonal front road wheel 1FR). Therefore, in case of the right-hand turn with a great lateral acceleration, the select-LOW process avoids undesired lack of the braking force applied to the outer rear road wheel (the rear-left road wheel) turning during braking on the right-hand turn, thus effectively reducing the braking distance.

As set forth above, the system can provide an optimal braking-force control (particularly for rear road wheels) suitable for various driving conditions, such as left-hand or right-hand turns with a great lateral acceleration, a straight-ahead driving condition, a driving condition on a split-$\mu$ road and the like. The system of the present invention can avoid undesired lack of an entire braking force of the vehicle, while ensuring a driveability, and effectively reduce the braking distance.

In the shown embodiments, although the wheel-speed arithmetic circuits 15FL, 15FR, 15RL and 15RR, the select-HIGH switch 16 and the pseudo vehicle speed generator 17 are constructed as external parts, the microcomputer 25 may be designed to contain functions of these parts 15FL to 15RR, 16 and 17.

As will be appreciated from the above, according to the system of the present invention, the system determines the presence or absence of a vehicle cornering state with a great lateral acceleration on the basis of the magnitude relationship among detected wheel speed data of four road wheels during braking on turns with a great lateral acceleration. When the system determines the presence of the cornering state with a great lateral acceleration, the anti-skid control for the outer rear road wheel (of heavier wheel load), can be executed by reference to both a wheel speed of the controlled outer rear road wheel and a wheel speed of its diagonal, inner front road wheel located on the vehicle diagonally to the controlled outer rear road wheel, that is, the hydraulic actuator associated with the controlled outer rear road wheel is controlled by reference to the wheel speed data of the diagonal road wheel pair, so that a braking force applied to the controlled outer rear road wheel is adjusted towards a value essentially identical to a braking force applied to the diagonal front road wheel and greater than the inner rear road wheel turning, whereby undesired lack of a braking force applied to the controlled outer rear road wheel can be prevented and thus the braking distance of the vehicle can be effectively reduced. Preferably, during braking on turns with a great lateral acceleration, the system of the invention can perform a so-called select-LOW process between the diagonal road wheel pair, so that a lower one of the wheel speed of the controlled outer rear road wheel and the wheel speed of the diagonal, inner front road wheel is selected and the hydraulic actuator associated with the controlled outer rear road wheel is controlled a slip ratio $\lambda j$ and an acceleration/deceleration indicative signal value V'wj, which values $\lambda j$ and V'wj are calculated from the lower wheel speed selected through the select-LOW process (see step S4$h$ of FIG. 5 and step 5$h$ of FIG. 6) between the diagonal road wheel pair. This maintains a braking force to be applied to the controlled outer rear road wheel at a value essentially identical to a braking force applied to the rotating inner front road wheel of a wheel load heavier than the rotating inner rear road wheel, while preventing wheel-lock at the controlled outer rear road wheel. Therefore, the braking distance can be effectively reduced. More preferably, during driving conditions except the previously-noted cornering state with a great lateral acceleration, namely during a straight-ahead driving on high-$\mu$ or low-$\mu$ roads or during straight-ahead driving on a so-called split-$\mu$ roads the system of the invention can perform a so-called select-LOW process between the opposite road wheel pair, so that a lower one of the wheel speed of the controlled rear road wheel and the wheel speed of the opposite rear road wheel is selected and the hydraulic actuator associated with the controlled rear road wheel is controlled a slip ratio $\lambda j$ and an acceleration/deceleration indicative signal value V'wj, which values $\lambda j$ and V'wj are calculated from the lower wheel speed selected through the select-LOW process (see step S4$k$ of FIG. 5 and step S5$k$ of FIG. 6) between the opposite rear road wheel pair. This enhances a driveability during straight-ahead driving on high-$\mu$ or low-$\mu$ roads, particularly on a split-$\mu$ road.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An anti-skid control system for an automotive vehicle, comprising:

a plurality of actuators each actuator associated with one of four road wheels located respectively at front-left, front-right, rear-left and rear-right portions of the vehicle, for adjusting braking forces applied to the four road wheels independently of each other;

sensors for detecting a wheel speed of the four road wheels to generate wheel-speed indicative signals; and a controller for controlling the actuators in response to the wheel-speed indicative signals, wherein the controller controls the actuators associated with the front wheels of the four road wheels independently of each other based on respective values of the wheel-speed indicative signals of the front wheels, wherein the controller controls the actuator associated with a controlled outer rear wheel of the four road wheels, which controlled outer rear wheel is subjected to a braking-force control, with reference to both a value of the wheel-speed indicative signal of the controlled outer rear wheel and a value of the wheel-speed indicative signal of a diagonal front wheel located on the vehicle diagonally to the controlled outer rear wheel, when the vehicle is in the cornering state with a high lateral acceleration during the braking-force control for the controlled outer rear wheel, wherein the controller controls the actuator associated with a controlled inner rear wheel of the four road wheels, which controlled inner rear wheel is subjected to a braking-force control, with reference to both a value of the wheel-speed indicative signal of the controlled inner rear wheel and a value of the wheel-speed indicative signal of an opposite rear wheel opposite to the controlled inner rear wheel, when the vehicle is in the cornering state with a high lateral acceleration during the braking-force control for said controlled inner rear wheel.

2. An anti-skid control system as claimed in claim 1, wherein the controller controls the actuator associated with the controlled outer rear wheel through a select-LOW process between the value of the wheel-speed indicative signal of the controlled outer rear wheel and the value of the wheel-speed indicative signal of the diagonal front wheel when the vehicle is in the cornering state with a high lateral acceleration during the braking-force control for the controlled outer rear wheel, and wherein the controller controls the actuator associated with the controlled inner rear wheel through a select-LOW process between the value of the wheel-speed indicative signal of the controlled inner rear wheel and the value of the wheel-speed indicative signal of the opposite rear wheel when the vehicle is in the cornering state with a high lateral acceleration during the braking-force control for the said controlled inner rear wheel.

3. An anti-skid control system as claimed in claim 2, wherein the controller controls the actuator associated with a controlled rear wheel of said four road wheels through a select-LOW process between a value of the wheel-speed indicative signal of the controlled rear wheel and a value of the wheel-speed indicative signal of an opposite rear wheel opposite to the controlled rear wheel when the vehicle is out of the cornering state with a high lateral acceleration during a braking-force control for the controlled rear wheel.

4. An anti-skid control system as claimed in claim 3, wherein the vehicle is in a left-hand cornering state with a high lateral acceleration during the braking-force control for the controlled rear wheel when a value of the wheel-speed indicative signal of a front-left road wheel is greater than a value of the wheel-speed indicative signal of a rear-left road wheel.

5. An anti-skid control system as claimed in claim 3, wherein the vehicle is in a right-hand cornering state with a high lateral acceleration during the braking-force control for the controlled rear wheel when a value of the wheel-speed indicative signal of a front-right road wheel is greater than a value of the wheel-speed indicative signal of a rear-right road wheel.

* * * * *